(12) United States Patent
Nupponen

(10) Patent No.: US 11,698,775 B2
(45) Date of Patent: Jul. 11, 2023

(54) SMART CODE EDITOR FOR DETECTING AND VISUALIZING DEVIATIONS

(71) Applicant: QENTINEL OY

(72) Inventor: Kimmo Nupponen, Espoo (FI)

(73) Assignee: QENTINEL QUALITY INTELLIGENCE OY, Espoo (FI)

( * ) Notice: Subject to any disclaimer, the term of this patent is extended or adjusted under 35 U.S.C. 154(b) by 261 days.

(21) Appl. No.: 17/306,157

(22) Filed: May 3, 2021

(65) Prior Publication Data

US 2021/0349697 A1    Nov. 11, 2021

(30) Foreign Application Priority Data

May 5, 2020 (FI) ..................................... 20205460

(51) Int. Cl.
| | |
|---|---|
| G06F 8/33 | (2018.01) |
| G06N 20/10 | (2019.01) |
| G06N 3/08 | (2023.01) |
| G06F 8/38 | (2018.01) |
| G06N 3/045 | (2023.01) |
| G06F 11/36 | (2006.01) |
| G06N 3/044 | (2023.01) |

(52) U.S. Cl.
CPC .................. *G06F 8/33* (2013.01); *G06F 8/38* (2013.01); *G06F 11/3604* (2013.01); *G06N 3/044* (2023.01); *G06N 3/045* (2023.01); *G06N 3/08* (2013.01); *G06N 20/10* (2019.01)

(58) Field of Classification Search
CPC .... G06F 8/33; G06F 8/38; G06N 3/02; G06N 3/08; G06N 20/10

USPC .................................................. 717/110–113
See application file for complete search history.

(56) References Cited

U.S. PATENT DOCUMENTS 8,336,030 B1 * 12/2012 Boissy .................. G06F 11/368
717/122
8,914,771 B2 * 12/2014 Kohli ........................ G06F 8/70
717/113

(Continued)

OTHER PUBLICATIONS

Hoffswell, Jane, et al., Augmenting Code with In Situ Visualizations to Aid Program Understanding, CHI '18: Proceedings of the 2018 CHI Conference on Human Factors in Computing Systems, Apr. 2018, 12 pages, [retrieved on Mar. 8, 2023], Retrieved from the Internet: <URL:http://dl.acm.org/>.*

(Continued)

*Primary Examiner* — Geoffrey R St Leger
(74) *Attorney, Agent, or Firm* — Nixon & Vanderhye PC

(57) ABSTRACT

According to an aspect, there is provided a computing device for performing the following. The computing device maintains, in a database, a first deviation detection algorithm for evaluating values of a first deviation metric. The computing device obtains, in the code editor, a plurality of logical lines of code and performs, for at least one logical line of code, the following. The computing device evaluates, using the first deviation detection algorithm, for a program instruction defined in a logical line of code, a value of the first deviation metric based at least on one or more other program instructions. The computing device selects a first color based on the first deviation metric from a first colormap. Finally, the computing device colors, in part or fully, a background or a text of the logical line of code or a graphical element associated with it with the first color.

18 Claims, 7 Drawing Sheets

(56) References Cited

U.S. PATENT DOCUMENTS

| | | | | |
|---|---|---|---|---|
| 2015/0348294 | A1* | 12/2015 | Sridharan | G06F 8/70 |
| | | | | 345/440 |
| 2017/0083290 | A1* | 3/2017 | Bharthulwar | G06F 9/4856 |
| 2018/0150742 | A1 | 5/2018 | Woulfe et al. | |
| 2018/0267883 | A1 | 9/2018 | Tezuka et al. | |
| 2019/0220253 | A1 | 7/2019 | Pradhan et al. | |
| 2019/0250893 | A1* | 8/2019 | Pandit | G06N 20/00 |
| 2021/0303447 | A1* | 9/2021 | Haze | G06F 11/3664 |

OTHER PUBLICATIONS

Wong, W. Eric, et al., Effective Fault Localization using Code Coverage, 31st Annual International Computer Software and Applications Conference, Jul. 2007, 8 pages, [retrieved on Mar. 8, 2023], Retrieved from the Internet: <URL:http://ieeexplore.ieee.org/>.*

Johnson, Brittany, et al., Why Don't Software Developers Use Static Analysis Tools to Find Bugs?, 35th International Conference on Software Engineering (ICSE), May 2013, 10 pages, [retrieved on Mar. 8, 2023], Retrieved from the Internet: <URL:http://ieeexplore.ieee.org/>.*

Search Report for FI20205460, dated Dec. 9, 2020, 1 page.

* cited by examiner

SMART CODE EDITOR FOR DETECTING AND VISUALIZING DEVIATIONS

This application claims priority to FI Patent Application No. 20205460 filed 5 May 2020, the entire contents of which is hereby incorporated by reference.

FIELD OF THE INVENTION

The present invention relates to smart script and code editors.

BACKGROUND

Smart code editors (or smart integrated development environments, IDEs or smart script editors) provide a variety of prediction functionalities to facilitate the code writing. For example, one function provided in some smart code editors is a function for detecting syntactical and semantical errors in the code and notifying the user of the detected errors. However, this function is typically quite limited in that only clear typos and/or obvious deviations from the known syntax are detected as errors. Therefore, there is a need for smart code editor solution which would perform error detection and notification in a more meaningful and robust way and thus further facilitate the task of writing code.

BRIEF DESCRIPTION OF THE EMBODIMENTS

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

In the following the invention will be described in greater detail by means of preferred embodiments with reference to the attached drawings, in which.

DETAILED DESCRIPTION OF EMBODIMENTS

Figure 1:
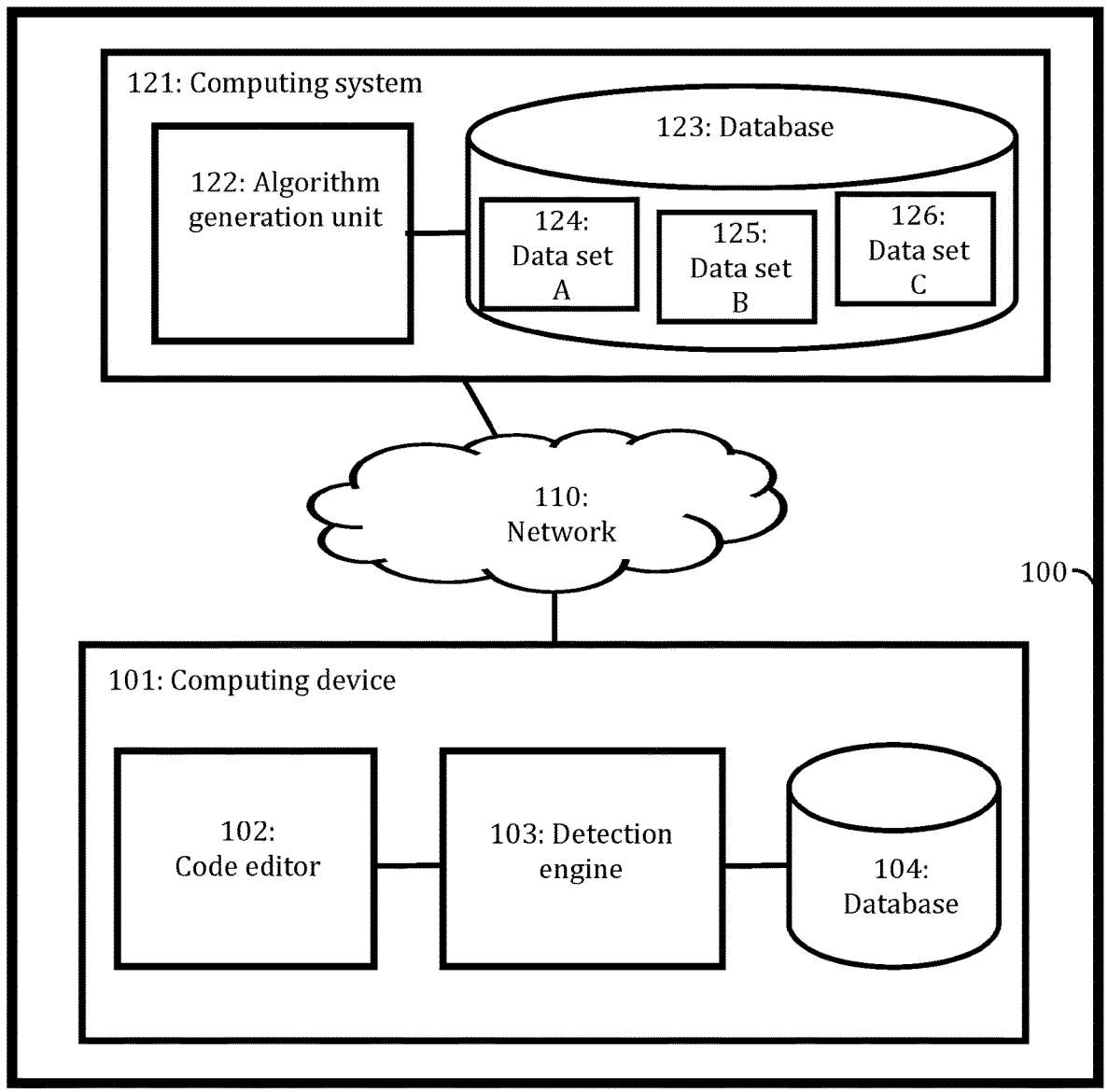
FIGS. 1 and 2 illustrate systems to which embodiments of the invention may be applied.

It will be obvious to a person skilled in the art that, as the technology advances, the inventive concept can be implemented in various ways. The invention and its embodiments are not limited to the examples described above but may vary within the scope of the claims.

Smart code editors (or smart integrated development environments, IDES or smart script editors) provide a variety of prediction functionalities to facilitate the code writing. For example, one function sometimes provided in smart code editors is a function for detecting syntactical and semantical errors in the code and notifying the user of the detected errors in real time. The embodiments seek to provide improvements over said known solutions where the error detection is typically quite limited in that only clear typos and/or clear deviations from the known syntax are detected as errors. Namely, the embodiments provide solutions which are able to identify behavioural deviations from a separately specified (or pre-defined) norm (or from pre-defined criteria or patterns). The embodiments allow early detection of anomalous code and enable detection of possible programming errors that cannot be detected by conventional smart code editors.

Furthermore, the embodiments provide improvements in visualizing in real time the extent of the deviation from the expected logical line of code. Namely, the results of the deviation analysis may be visualized according to embodiments as heatmaps (or colormaps) in real-time in the graphical user interface (GUI) of the code editor. Therefore, the embodiments further facilitate the decision making of the user in regards to error correction by allowing the user to focus on most important aspects in the scripts/programs and to quickly grasp the "hot spots" that may require immediate attention.

The embodiments may offer a significant improvement in the user's operation by providing user a level of understanding about the logical code content. This not only improves the productivity of the user, but also has the potential to increase the quality of the scripts or programs created by the user. The quality improvement is a direct consequence of the capability to detect unexpected, abnormal behavior in the scripts or programs.

At least some of the embodiments to be discussed below in detail are based on training an artificial neural network (NN) such as a recurrent neural network and subsequently using said trained neural network for predicting next logical lines of code in a code editor. To facilitate the following detailed discussion on the embodiments based on neural networks, neural networks are discussed here briefly in general.

The embodiments may employ one or more neural networks for machine learning in order to perform deviation detection. Neural networks (or specifically artificial neural networks) are computing systems comprised of highly interconnected "neurons" capable of information processing due to their dynamic state response to external inputs. In other words, an artificial neural network is an interconnected group of nodes (or "neurons"), where each connection between nodes is associated with a weight (i.e., a weighting factor), the value of which affects the strength of the signal at said connection and thus also the total output of the neural network. Usually, a bias term is also added to the total weighted sum of inputs at a node. Training of a neural network typically involves adjusting said weights and biases so as to match a known output given a certain known input.

The neural networks employed in embodiments may be deep neural networks (DNN), that is, artificial neural networks (ANN) with multiple layers between the input and output layers. Alternatively or additionally, the neural network used in embodiments may be dense neural networks. Dense neural networks are neural network where layers are fully connected (i.e., dense) by the neurons in a network layer. In other words, each neuron in a layer receives an input from all the neurons present in the previous layer. Correspondingly, a dense layer is a fully connected layer, meaning all the neurons in a layer are connected to those in the next layer.

Neural network may be divided into feedforward neural networks and recurrent neural networks. An example of a feedforward neural network which may be employed in embodiments is a multilayer perceptron model or network which is a network of simple perceptrons. A single layer perceptron can be used to learn linearly separable functions but cannot be used to perform complex tasks like learning a non-linear decision boundary in classification. On the other hand, a multilayer perceptron network, which uses two or more layers of perceptrons, may be used to learn complex functions and highly non-linear decision boundaries. A multilayer perceptron network is a basic form of a feedforward neural network and typically consists of an input layer, one or more hidden layers and an output layer. The network uses forward passes and backpropagation to learn the weights and bias. Forward passes (from input to output) calculate the outputs, while backpropagation calculates the necessary updates for the weights and biases based on the error at the output layer.

Convolutional neural networks (CNNs) are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme. In general, CNNs may be defined as neural networks that use convolution in place of general matrix multiplication in at least one of their layers.

Recurrent neural networks (RNNs), in contrast to feedforward neural networks, have loops in them and thus possess the capability of storing information. One example of a recurrent neural network which may be employed in embodiments is a long short-term memory (LSTM) which is a special type of recurrent neural network specialized in learning long-term dependencies. A single LSTM cell consists of three gates (input, output and forget gate) and a memory cell. Gates act as regulators of information and help LSTM cells to remove old information or add new information. The extent to which the existing memory is forgotten is controlled by the forget gate. Another example of a recurrent neural network which may be employed in embodiments and which is also capable of learning long-term dependencies is a gated recurrent unit (GRU). While long short-term memories employ three gates, there are only two gates in a GRU (called reset and update gate) which makes gated recurrent units simpler and faster than long short-term memories. Other recurrent neural networks may also be employed in connection with embodiments.

For performing deviation detection according to embodiments, one possible approach is to formulate the deviation detection problem as a sequential modelling problem and to leverage neural network architectures that are suited for the sequential modelling problem in hand, such as recurrent neural networks. Technically, such a deviation detection algorithm may be implemented as an iterative algorithm that first calculates a probability distribution of the most probable next step (i.e., of the most probable program instruction) for each subsequence of program instructions (defined on logical lines of code) in the script/program and then compares the probability distribution of the most probable steps, to the observed step in the script/program. Comparably larger "distance" between the expected and observed values indicates a larger deviation and anomaly from the norm. Said distance may typically correspond to the output of a particular loss function. In some embodiments, prediction models other than neural network-based prediction models may be employed in connection with the sequential modelling discussed in this paragraph.

In some embodiments, the one or more neural networks used may be specifically replicator neural networks. A replicator neural network is a particular type of feed-forward neural network (e.g., a multilayer perceptron network) which is trained to replicate input data points as desired outputs. In other words, in the replicator neural network the input variables are also the output variables so that the replicator neural network forms an implicit, compressed model of the training data during training. The replicator neural network comprises a hidden layer that uses a staircase-like activation function. The staircase-like activation function makes the network compress the data by assigning it to a certain number of clusters (depending on the number of neurons and number of steps).

In some embodiments, one or more autoencoder neural networks may be employed. An autoencoder neural network (or simply an autoencoder) is an artificial neural network which is used for learning efficient data codings in an unsupervised manner. An autoencoder may be implemented, for example, as a feed-forward, non-recurrent neural network though more complicated neural network may also be employed. Autoencoders are in many ways similar to the replicator neural networks discussed above though some difference do exist (e.g., in the definition of the hidden layer). Similar to the replicator neural networks, the aim of an autoencoder is to learn a representation (encoding) for a set of data, typically for dimensionality reduction, by training the neural network to ignore signal "noise" (i.e., irrelevant information in the input). Therefore, the autoencoder tries to generate, from the reduced encoding, a representation as close as possible to its original input. In other words, an autoencoder is a neural network that learns to copy its input to its output, at least approximately, preserving only the most relevant aspects of the data in the copy. It has an internal (hidden) layer that describes a code used to represent the input, and it is constituted by two main parts: an encoder that maps the input into the code, and a decoder that maps the code to a reconstruction of the original input. The hidden layer is constrained so that it has fewer neurons than the input/output layers. As performing the copying task perfectly would simply duplicate the signal, autoencoders usually are constrained in one way or another. For example, sparse or undercomplete autoencoder may be used. Sparse autoencoders include more (rather than fewer) hidden units than inputs, but only a small number of the hidden units are allowed to be active at once. In undercomplete autoencoders, feature space has lower dimensionality than the input space resulting in a feature vector which may be regarded as a compressed representation of the input.

Autoencoders and replicator neural network, therefore, are suitable technical solutions for implementing a detection engine for detecting any deviations or anomalies as by letting the autoencoder or replicator neural network to learn how to replicate the most crucial features of the normative data set, the neural network is encouraged to learn how to precisely reproduce the most frequent characteristics of the observations. When facing deviations, the neural network reconstruction performance deteriorates. This deterioration serves as an indication of an existence of a deviation or an anomaly. In other words, a normal, non-anomalous input provided for the trained autoencoder or trained replicator neural network results in an output which (substantially) replicates the input while an anomalous input provided for the trained autoencoder results in an output which differs from the input as the autoencoder or the replicator neural network has not been taught to replicate anomalous data.

In some embodiments, support vector machines (SVMs) may be employed for machine learning. SVMs are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (although methods such as Platt scaling exist to use SVM in a probabilistic classification setting).

In the following discussion of detailed embodiments, the following definitions may apply. A program instruction may correspond to any of the following: a function, a keyword, a step, a method, a procedure, a statement, an expression, a routine, a subroutine, or a subprogram. A program instruction may be equally called a (logical) action. Further, a parameter may correspond to any input required by any program instruction (including any types listed above). A parameter may be, for example, a (function) parameter or an argument. The term "program instruction" is assumed, in the following, to exclude any possible parameters defined for the program instruction. Moreover, "a program" as used in embodiments is a generic term which covers also scripts. "Code" as used in connection with embodiments may refer specifically to source code (of a program). Further, the embodiments discussed below are not limited to any particular programming or scripting language or syntax used therein. Furthermore, a machine-learning algorithm may be defined as a prediction algorithm based on one or more machine-learning models (e.g., one or more neural networks). A logical line of code is defined as a section or part of code containing a single executable statement (e.g., a program instruction and a set of zero or more parameters defined for said program instruction). For example, in the C programming language and C-like programming languages, each logical line of code ends with a (statement-terminating) semicolon. A single logical line of code may correspond to a single physical line of code, a part of a single physical line of code or multiple physical lines of code (depending, e.g., on the programming style used).

An architecture of a communications system to which embodiments of the invention may be applied is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

FIG. 1 illustrates a system comprising a computing system 121 which is connected via a communications network 110 to a computing device 101. Specifically, the computing device 101 may be a local computing device and the computing system 121 may be a remote computing system or a local computing system.

The computing device 101 (equally called a user device or user equipment, UE or a terminal device) refers to a portable or non-portable computing device (equipment, apparatus). Computing devices which may be employed include wireless mobile communication devices operating with or without a subscriber identification module (SIM) in hardware or in software, including, but not limited to, the following types of devices: desktop computer, laptop, touch screen computer, mobile phone, smart phone, personal digital assistant (PDA), handset, e-reading device, tablet, game console, note-book, multimedia device, sensor, actuator, video camera, car, wearable computer, telemetry appliances, and tele-monitoring appliances. In a typical non-limiting embodiment, the terminal device 101 may be a desktop computer or a laptop computer.

The computing device 101 comprises a code editor (software) 102, a detection engine or unit 103 integrated into the code editor 102 (being integrated to it) and database 104. The computing device 101 may further comprise any conventional software/hardware elements of a desktop or laptop computer such as one or more user input devices (e.g., a keyboard and a mouse) and a display.

The computing device 101 is configured to run a code editor software 102 enabling a user of the computing device to write code using at least one user input device (e.g., a keyboard) of the computing device 101. The code editor may, in some embodiments, be specifically a script editor (i.e., a code editor for writing scripts using a scripting language). The code editor 102 may be or form a part of an integrated development environment (IDE). The syntax and the semantics of the code may vary, and the embodiments are not limited to any one scripting, modelling or programming notation.

Depending on the current editing context of the code editor 102, the code editor 102 may be configured to extract various pieces of information from a data buffer of the code editor 102 and provide said information to the detection engine 103 for performing deviation detection (equally called error detection, anomaly detection or outlier detection). This may involve, for example, extracting a sequence of all the program instructions (i.e., logical actions defined by the user), such as function, method or keyword calls, defined in a source code of a program and optionally also parameters or arguments of said program instructions. The embodiments seek to evaluate the logical lines of code in a program for detecting deviations or anomalies from the norm (i.e., statistically significant deviations from how a program is typically written based on a normative data set or a codebase). If a significant deviation from the norm (i.e., a deviation which fails to satisfy pre-defined criteria for "normal" behavior) is detected, this indicates that an error has likely occurred in writing the program. What is considered a significant deviation may depend on various factors such as the properties of the code editor 102 and the use case/application. The contextual information that the code editor collects is, therefore, very much tied to the objective at hand.

The code editor 102 is further configured to present results of the deviation detection performed by the detection engine 103 to the user of the computing device 101 (via a display). The results of the deviations may be presented to the user specifically by highlighting any (logical) lines of code deviating from the norm by coloring them or their background with a color selected based on the extent of said deviation. In other embodiments, a (graphical) element (e.g., a marker) in the graphical user interface associated with a (logical) line of code deviating from the norm may be colored with said color selected based on the extent of said deviation.

The computing device 101 further comprises a detection engine or unit 103 running in connection with the code editor 102 (being integrated to it) and providing deviation detection and evaluation functionalities according to embodiments for the code editor 102. Specifically, the detection engine 103 may be configured to predict or evaluate whether logical lines of code provided in a program or script edited in the code editor 102 deviate from a (pre-defined) norm. Said prediction or evaluation may be specifically based on one or more other logical lines of code in said program or script (preferably, a plurality of other logical lines of code). Moreover, the extent of this deviation is also evaluated for each logical line of code. The detection engine 103 may employ, for the detection, one or more deviation detection algorithms (e.g., based on trained machine-learning models) generated by the computing device 101 and/or by another apparatus (or specifically by the computing system 121). Said one or more deviation detection algorithms may be real-time algorithms. Separate algorithms may be provided for detecting deviations in program instructions (i.e., functions, keywords and methods) and arguments or parameters associated with said program instructions though in some embodiments both types of data may be processed using a single algorithm. The information on the one or more other logical lines of code received from the code editor 102 may be pre-processed (e.g., tokenized and/or vectorized) before using them as an input for the prediction algorithms.

Specifically, the deviation detection performed by the detection engine 103 may correspond to semi-supervised deviation detection. In semi-supervised deviation detection techniques, a machine-learning model representing normal or typical behavior is generated and trained using a given (normative) training data set (i.e., a normative data set assumed to represent typical behavior), and then the likelihood of a test instance (here, a particular logical line code in a given position in a program or a part thereof) to be generated by the trained machine-learning model is tested. The normative data sets used in semi-supervised deviation detection may be assumed to mostly consist of normal, non-anomalous samples (here, sequences of program instructions and their parameters) though some anomalous samples may be included.

Each deviation detection algorithm may have been generated based on some form of a priori information. The a priori information (or a priori data or normative data) leveraged by the detection engine 103 may be sourced from multiple data sources and it may involve some hand-crafted expert mechanism as well. That is, the approach may base the predictions on a collection of arbitrary data from which it draws conclusions from or it may well be a hand-crafted expert approach that instead of leveraging any data sets, for example, it makes decisions and predictions based on expert knowledge for example utilizing a database of hand-crafted rules. Which a priori information is to be used for the prediction may explicitly defined by the user of the computing device.

The database 104 comprises at least information required for running the code editor 102 and the detection engine 103. For example, said information comprised in the database 104 may comprise one or more deviation detection algorithms (e.g., one or more trained machine-learning algorithms), one or more programs or scripts written using the code editor 102 and/or information extracted from said one or more programs or scripts and being usable as an input for the deviation detection using the detection engine 103. Said one or more programs may comprise both finished programs and programs which are still works-in-process.

The communications network 110 enabling communication between the computing device 101 and the computing system 121 may comprise one or more wireless networks and/or one or more wired networks. Said one or more wireless networks may be based on any mobile system, such as GSM, GPRS, LTE, 4G, 5G and beyond, and a wireless local or personal area network, such as Wi-Fi or Bluetooth. The communications network 110 may comprise the Internet. In some embodiments, the communications network 110 may be replaced with a wired or wireless communication link.

The computing system 121 may comprise at least an algorithm generation unit 122 connected to a database 123. The algorithm generation unit 122 may be a non-distributed server or a distributed server (a cloud server) and the database 123 may be a non-distributed database or a distributed database (a cloud database). The computing system 121 may also comprise one or more other network devices (not shown in FIG. 1), such as a terminal device, a server and/or a database. The computing system 121 is configured to communicate with the computing device 101 via the communications network 110. The computing system 121 and the database 123 may form a single database server, that is, a combination of a data storage (database) and a data management system or they may be separate entities. The data storage may be any kind of conventional or future data repository, including distributed and/or centralised storing of data, a cloud-based storage in a cloud environment (i.e., a computing cloud), managed by any suitable data management system. The implementation of the data storage is irrelevant to the invention, and therefore not described in detail here. In some embodiments, the computing system 121 may be a fully cloud-based computing system. Further, it should be appreciated that the location of the computing system 121 is irrelevant to the invention (i.e., it may be a remote system or a local system in view of the computing device 101). The computing system 121 may be operated and maintained using one or more other network devices in the system or using a terminal device (not shown in FIG. 1) via the communications network 110.

While FIG. 1 shows that the computing system 121 is connected via the communications network 110 to a single computing device 101 for simplicity of presentation, in other embodiments, the computing system 121 may be connected via the communications network 110 to multiple computing device (each being similar to the computing device 101).

The algorithm generation unit 122 according to embodiments may be configured to process data in the database 123 for generating deviation detection algorithms for use by the detection engine 103 of the computing device 101. The algorithm generation unit 122 may be, for example, a machine-learning unit for generating and training machine-learning-based deviation detection algorithms (i.e., deviation detection algorithms based on the use of one or more machine-learning models such as one or more neural networks). In other embodiments, the algorithm generation unit 122 may be configured to generate deviation detection algorithms of some other type.

The database 123 may comprise a plurality of (normative) data sets 124 to 126 used for generating deviation detection algorithms (e.g., training a machine-learning-based deviation detection algorithm). Each data set 124 to 126 may comprise at least (finished or finalized) code defining a set of programs (or scripts). Each data set 124 to 126 may specifically define a normative data set or a codebase (i.e., the norm or standard) to which programs (or specifically individual logical lines of code defined therein) are to be compared to find deviations. The generated deviation detection algorithms seek to capture the typical patterns found in said normative data set. For example, this might entail determining which program instructions typically follow each other and which rarely do. The set of programs associated with a particular normative data set may correspond to a shared use case or application and/or they may originate from a shared data source (e.g., from a particular computing device or from a particular public library of programs). Alternatively or additionally, said set of programs may be associated with a particular user of a code editor or a particular group of users (e.g., users associated with a particular organization or company). On the other hand, some of the data sets 124 to 126 may comprise a very large set of programs created by a plurality of user and for a plurality of different use cases and applications. The scope of a given data set may depend, for example, on the type of deviation detection algorithm which is to be generated based on said data set and input and outputs (i.e., features and labels) defined for said deviation detection algorithm. By selecting different data sets 124 to 126 as the basis for the deviation detection algorithm generation (e.g., the data set may acts as a training data set for a machine-learning algorithm), deviation detection algorithms which are specific to a particular use case, application, user and/or group of users may be generated. Programs written by a user using the computing device 101 may be transmitted (or uploaded) to the database via the communications network 110. At least some of the data sets 124 to 126 may have been defined by a user of the computing device 101. Further, the user of the computing device 101 may be able to define the properties of the deviation detection algorithms to be generated (e.g., criteria for detecting a deviation).

In some embodiments, the data sets 124 to 126 maintained in the database 123 and used by the algorithm generation unit 122 may also comprise data other than finished programs or scripts created earlier. For example, the data sets 124 to 126 may comprise execution log files and/or user documentation.

In some embodiments, the detection engine 103 and/or the database 104 may form a part of the (remote) computing system 121 (as opposed to being a part of the computing device 101). In such embodiments, the computing device 101 merely serves to run the code editor 102 and forward information extracted from the code editor (i.e., logical lines of code) via the communications network 110 to the computing system 121 for further processing (i.e., processing described in relation to elements 103, 104, 121-126) and subsequently receive results of said processing and integrate them to the code editor 102 (i.e., indicate abnormal logical lines of code in the code editor 102 based on the received results).

Figure 2:
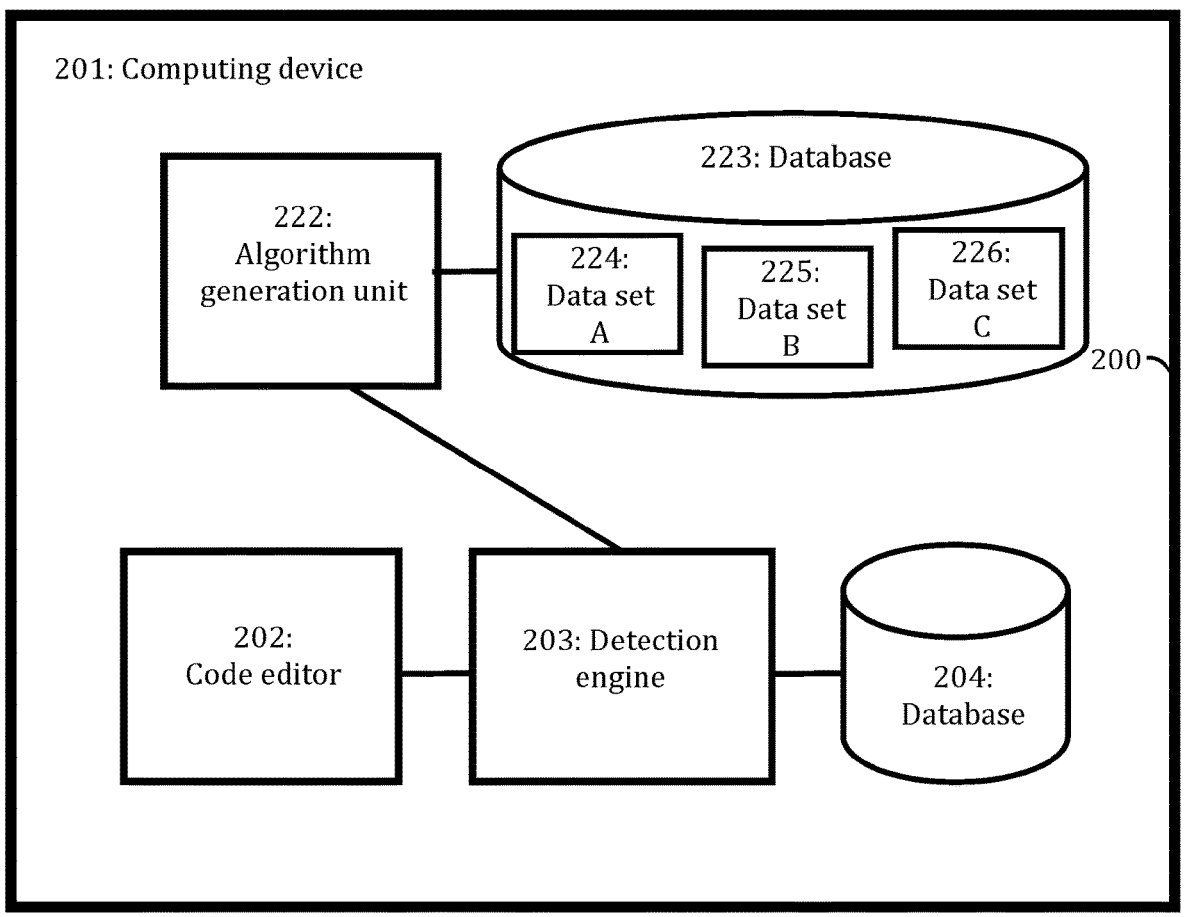

While in FIG. 1 it was assumed that the generation of the deviation detection algorithms used by them was carried out by a separate entity from the computing device 101 running the code editor 102 and being operated by a user, in other embodiments, both functionalities may be carried out (locally) by a single computing device which is also running the code editor. One such an alternative architecture is illustrated in FIG. 2 where a single computing device 200 providing functionalities of both the computing device 101 and the computing system 121 of FIG. 1 is provided. The above description pertaining to FIG. 1 and elements therein applies also for system of FIG. 2 and is thus not repeated here for brevity. In other words, elements 202 to 204, 222 to 226 may correspond to elements 102 to 104, 122 to 126 of FIG. 1 as described above (taking into account obvious differences such as that communication between the algorithm generation unit 222 and the detection engine 203 is no longer provided via a communications network as they are parts of the same computing device).

In some embodiments, a combination of the architectures of FIGS. 1 and 2 may be provided. In other words, both the computing device running the code editor and the (remote) computing system may be configured to generate/train deviation detection algorithms. In such embodiments, some of said functionalities may be carried out by the computing device running the code editor and others by the computing system. For example, computationally demanding tasks such as generating and training complex machine-learning-based algorithms may be carried out by the computing system while the computing device may carry out such tasks which may be performed without seriously burdening the processor of the computing device and thus hindering the usability of the code editor (e.g., generation of a weighted search tree algorithm or other more simple prediction algorithms).

Figure 3:
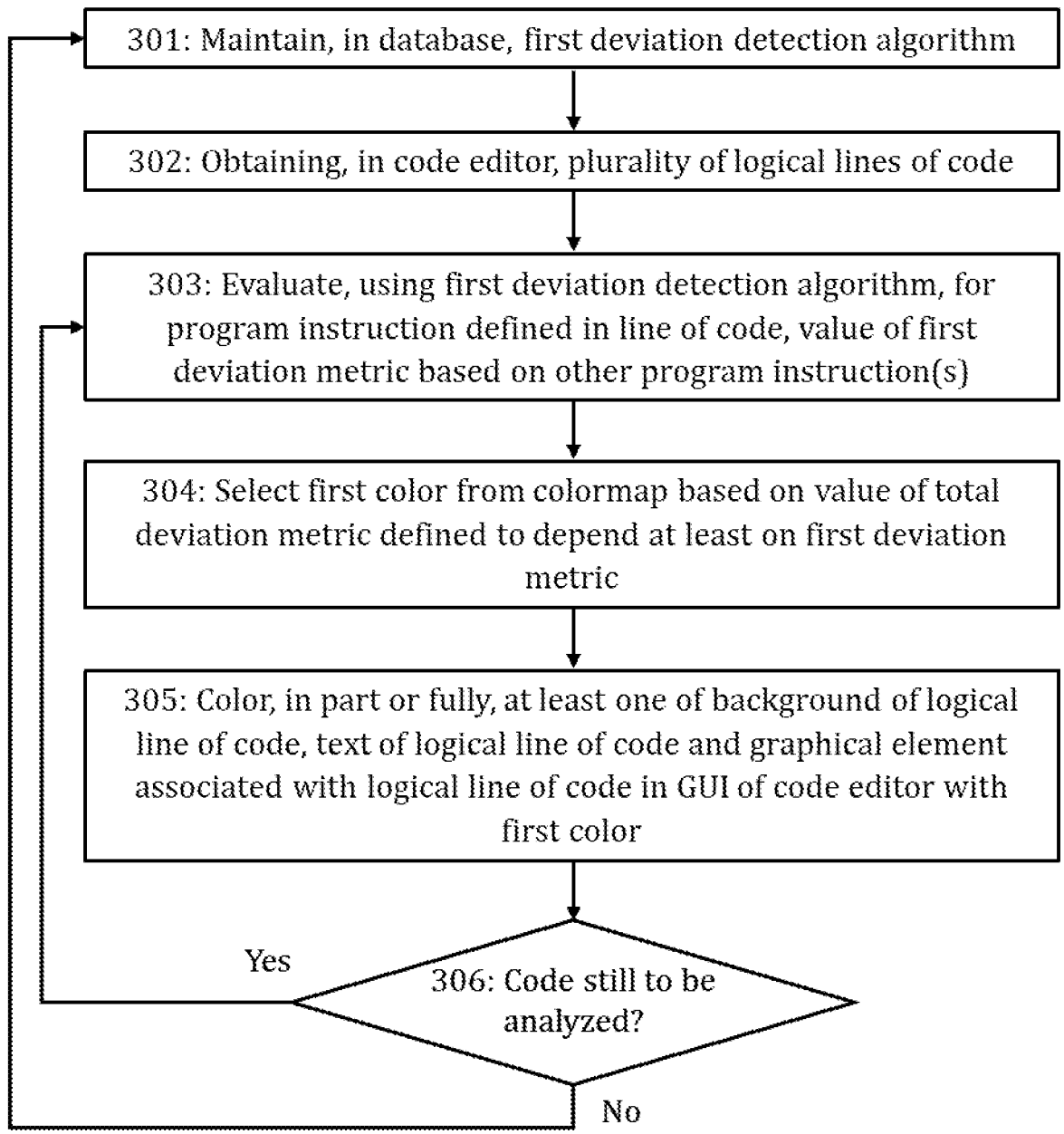
FIGS. 3 to 6 illustrate processes according to embodiments.

FIG. 3 illustrates a process according to an embodiment for detecting deviations (i.e., possible errors) in code and indicating said deviations and their extent to a user. The illustrated process may be performed by the computing device 101 of FIG. 1 or the computing device 201 of FIG. 2.

Referring to FIG. 3, it is initially assumed that the computing device maintains, in block 301, in a database, a first deviation detection algorithm for evaluating values of a first deviation metric based on the plurality of logical lines of code in the code editor (or at least some of them). The first deviation metric quantifies a deviation of a program instruction provided in a (logical) line of code in a code editor from a corresponding normative program instruction. In other words, the first deviation metric quantifies the extent to which a particular program instruction in a sequence of program instructions deviates from normative data based on which the first deviation detection algorithm (or specifically a first machine-learning model used by the first deviation detection algorithm) was generated. The first deviation detection algorithm may have been generated specifically based on a first normative data set comprising (finished or finalized) code for a plurality of programs. The first normative data set (or equally a first normal data set) is a data set used for defining for the first deviation detection algorithm how a (source) code for a program is typically written, i.e., what are the typical recurring patterns which can be found in many or most programs (e.g., which program instructions typically follow a particular program instruction) and which patterns are rarely or never encountered. The deviation detection may take into account not only on contents of said one or more logical lines of code but also their order (i.e., a sequence formed by the one or more program instructions). How the first deviation detection algorithm may be generated is discussed in detail in relation to FIG. 6. Said database may be an internal database of the computing device or an external database.

The first deviation detection algorithm may perform specifically semi-supervised deviation detection. Semi-supervised deviation detection techniques construct a model representing normal behavior from a given normal training data set (here, the first normative data set), and then test the likelihood of a test instance to be generated by the learnt model. Thus, the first normative data set may be assumed to represent, fully or at least mostly, normal, non-anomalous behavior.

The first deviation metric may correspond, for example, to a reconstruction loss (or reconstruction error) associated with a first machine-learning model (e.g., a replicator neural network or an autoencoder) of the first deviation detection algorithm. The reconstruction loss is a common metric in deviation detection. The reconstruction loss (or reconstruction loss function) is usually defined as either the mean-squared error or cross-entropy between the output and the input of a neural network. High reconstruction loss corresponds to high deviation from the norm.

In some embodiments, the first deviation detection algorithm may be a first trained machine-learning algorithm, i.e., an algorithm based on a first trained machine-learning model. The first trained machine-learning model may comprise on one or more neural networks or one or more support vector machines. The one or more neural networks may comprise, for example, one or more recurrent neural networks, one or more convolutional neural networks or a combination thereof. In some embodiments, the first machine-learning model may specifically comprise an autoencoder neural network or a replicator neural network configured to replicate its input (i.e., a sequence of program instructions) in its output for normal inputs but deviate from this behavior with abnormal or anomalous inputs. In some embodiments, the first trained machine-learning model may be specifically a first trained machine-learning model for predicting most probable next program instructions based at least on one or more preceding program instructions. A sliding window applied over the sequence of program instructions may be used for defining the input of the first machine-learning model (as opposed to inputting all the program instructions in the sequence).

In some embodiments, the first deviation detection algorithm is based on a plurality of pre-defined rules for detecting deviations in observed program instructions based on one or more other program instructions defined in the program.

The computing device obtains, in block 302, in the code editor, a plurality of logical lines of code defining a program or a part thereof. This action may correspond, for example, to a user typing a plurality of logical lines of code in the code editor running in the computing device for particular program (i.e., for a particular project) or a user opening a (source) code of a program in a code editor. Specifically, the computing device may obtain the plurality of logical lines of code from the data buffer of the code editor. The program may be, for example, a script for test automation or robotic process automation.

Then, the computing device performs, for each of at least one of the plurality of logical lines of code in the code editor (preferably, all of the plurality of lines code), the following steps described in relation to blocks 303 to 305. First, the computing device evaluates, in block 303, using the first deviation detection algorithm, for a program instruction defined in a logical line of code at a given position in the program, a value of the first deviation metric based on one or more other logical lines of code in the plurality of logical lines of code). Specifically, evaluation in block 303 may be based on a sequence of program instructions defined in the plurality of logical lines of code. In some embodiments, the evaluation in block 303 may be based specifically on a sequence of one or more program instructions preceding the program instruction under analysis.

Said plurality of logical lines of code (or a part thereof) may be pre-processed, in block 303, before they are used as an input of the first deviation detection algorithm. The pre-processing may be divided into two pre-processing phases for, first, extracting information from said plurality of logical lines of code (i.e., extracting information from the data buffer of the code editor) and, then, converting the information derived in the first phase to a format which may be used as an input of the first deviation detection algorithm.

In the first pre-processing phase, the computing device may perform lexical analysis (or tokenization) on the logical lines of code so as to convert them into a sequence of lexical tokens (strings with an assigned and thus identified meaning). A lexical token or simply token is structured as a pair consisting of a token name and an optional token value. The token name is a category of lexical unit. Examples of common token names are identifier, keyword, separator, operator and literal. Each program instruction and each parameter defined for a program instruction may correspond to a single lexical token. The sequence of lexical tokens may be filtered so as to remove any lexical tokens not associated with program instructions. Additionally or alternatively, the pre-processing in the first phase may comprise, for example, syntactic and/or semantic analysis and/or validation functionalities.

In the second pre-processing phase, the computing device may perform word embedding for string data associated with said one or more logical lines of code (or specifically with each program instruction defined in the one or more logical lines of code). In other words, string data is mapped to numerical values or specifically to a vector comprising numerical values so that it may be used as an input of the first deviation detection algorithm. This process is sometimes called "vectorization". Said string data may be derived according to the tokenization process described above. Additionally, normalization may be performed for at least some of the numerical values. In some embodiments, the vectorization may be performed using a separate machine-learning model (e.g., a neural network), that is, a machine-learning model not used (directly) by the first deviation detection algorithms The pre-processing may be performed by the code editor or detection engine or by both the code editor and the detection engine. In the latter option, the initial pre-processing (e.g., generating lexical tokens) may be performed by the code editor and the results of said initial pre-processing may be forwarded to the detection engine which then performs further pre-processing (e.g., converting lexical tokens into numerical values accepted by the first deviation detection algorithm or by the prediction model employed by it). In some embodiments, a separate pre-processing unit may be provided in the computing device for performing pre-processing.

In some embodiments, the first deviation detection algorithm is based on a first prediction model for predicting most probable next program instructions based at least on one or more preceding program instructions (defined on one or more preceding logical lines of code). The first prediction model may be, for example, a (trained) machine-learning model based on one or more neural networks (e.g., a LSTM) or one or more SVMs or some simpler algorithm such as one based on a weighted search tree. In such embodiments, the evaluation in block 303 using the first deviation detection algorithm may comprise the following. The computing device may calculate, using the first prediction algorithm, a probability distribution of the most probable program instructions to be included in said logical line of code containing said program instruction under analysis based at least on one or more program instructions preceding said program instruction. Said one or more program instructions may comprise all preceding program instructions. Alternatively, said one or more preceding program instructions may comprise only some of all preceding program instructions. The one or more preceding program instructions may be defined, in this case, via a sliding window applied over the sequence of program instructions, for example. In some embodiments, said one or more preceding program instructions may comprise a pre-defined number of preceding program instructions. Then, the computing device calculates the value of the first deviation metric based on the probability distribution of the most probable program instructions and said program instruction actually included in said logical line of code. Here, the first deviation metric is defined as a first distance measure quantifying a relative difference (or "distance") between the probability distribution of the most probable program instructions and the program instruction included in said logical line. In other words, the first distance measure quantifies the extent to which the (observed) program instruction matches the probability distribution, that is, how likely the (observed) program instruction is in view of the probability distribution. Specifically, the first distance measure may be calculated based on said probability distribution defined as a predicted probability vector $p=[p_1\ p_2\ \ldots\ p_n]$ and a corresponding observed probability vector defined for the (observed) program instruction $p^{obs}=[p_1^{obs}\ p_2^{obs}\ \ldots\ p_n^{obs}]$, where the element in the probability vector $p^{obs}$ associated with the observed program instruction is equal to 1 while all the other elements of $p^{obs}$ are equal to 0. Here, n is the number of the different (most probable) program instructions in the probability distribution. To give a simplistic example with a probability distribution of four (most probable) program instructions, the above probability vectors may be defined as $p=[0.03\ 0.17\ 0.7\ 0.1]$ and $p^{obs}=[0\ 0\ 1\ 0]$. For example, the first distance measure may be defined as a mean squared error (MSE) between the probability distribution of the most probable program instructions and said program instruction included in said logical line of code (or specifically, between probability vectors defined for the probability distribution and said (observed) program instruction, as described above). In general, the first distance measure may be any distance measure employed, for example, in connection with machine learning (e.g., Euclidean distance, Manhattan distance or Minkowski Distance). The first distance measure may be defined or selected by the user of the code editor. The first distance measure may be alternatively called a reconstruction loss.

In embodiments where the first deviation detection algorithm is a first trained machine-learning algorithm based on an autoencoder or a replicator neural network, the evaluation in block 303 using the first deviation detection algorithm may comprise, e.g., the following. The computing device uses a sequence of program instructions defined in the plurality of logical lines of code (all or some of them) as an input of the autoencoder or replicator neural network. The sequence of program instructions used as the input may comprise a pre-defined number of program instructions. The sequence of program instructions used as the input may be defined as a sliding window (of a pre-defined width). This sliding window is applied to each possible position in the plurality of logical lines of code (i.e., it is slid across the plurality of logical lines of code). One movement step of the sliding window may correspond to a movement by a program instruction (i.e., by a logical line of code). As described above, the autoencoder/replicator neural network replicates its input in its output as long as the input is non-anomalous. Thus, the computing device obtains, at each position of the sliding window, an output of the autoencoder or replicator neural network comprising a replicated sequence of program instructions (for a sequence of program instruction bounded by the sliding window). The computing device may calculate, for each produced output, reconstruction loss (e.g., a MSE) between the input and the output. Finally, the computing device calculates, for each program instruction defined in a logical line of code at a given position in the program, the value of the first deviation metric based on the inputs and outputs of the autoencoder or replicator neural network associated with the program instruction under analysis. Said inputs and outputs associated with the program instruction under analysis comprise, here, each output produced when a sliding window defining the input is applied so as to cover said program instruction. Specifically, the value of the first deviation metric may be calculated based on values of reconstruction loss calculated for said inputs and outputs associated with the program instruction under analysis. For example, the value of the first deviation metric may be calculated as an average or a sum over said values of reconstruction loss.

Then, the computing device selects, in block 304, a first color based on a value of a total deviation metric from a first colormap (or a first "heatmap") providing a mapping at least to all feasible values of the total deviation metric. The value of the total deviation metric may be defined to depend at least on the value of the first deviation metric. In some embodiments, the total deviation metric may be the first deviation metric. In other embodiments, the value of the total deviation metric is defined to depend not only on the value of the first deviation metric but also on at least one value for another metric such as a second deviation metric used for evaluating deviations in parameters provided for program instructions (to be discussed in detail below). The total deviation metric may also be defined using one or more common mathematical manipulations such as multiplication/subtraction by a constant, normalization and taking a logarithm.

The first colormap used in block 304 may be any known colormap. For example, the first colormap may be a rainbow colormap or a two-hue colormap. The first colormap may be a continuous (sequential) or discontinuous colormap. Preferably, the colormap is defined so that a contrast between a default background color of the code editor (typically, e.g., white or any light tone) and a color in the color map associated with a value of the total deviation metric increases as the value of the total deviation metric increases. This way the eye of the user of the code editor is more efficiently guided towards those lines of code which are most likely to be erroneous. In some embodiments, the first colormap may be a sequential colormap with the lowest value or a pre-defined range of lowest values of the total deviation metric mapping to a color in the first colormap corresponding to the background color of the code editor.

Finally, the computing device colors, in block 305, in part or fully, at least one of a background of said logical line of code, a text of said logical line of code and a graphical element associated with said logical line of code in a graphical user interface (GUI) of the code editor with a first color for indicating an extent of deviation of said logical line of code from a norm (as defined by the first normative data set based on which the first deviation detection algorithm was generated and based on which it operates) to a user of the computing device.

In some embodiments, the computing device may color, in block 305, at least a text defining a program instruction in said logical line of code or a background of said text.

The graphical element in block 305 may have a pre-defined shape and a pre-defined location within the GUI of the code editor. For example, the graphical element may be a colored square or rectangle. The graphical element may be located, for example, substantially at the right or left edge of the GUI of the code editor substantially aligned vertically with the associated logical line of code (for enabling the user to see easily which graphical element relates to which logical line of code). To give a bit more general example, the graphical element may be located to the right or to the left from the logical line of code. The graphical element may be shown for each line or logical line of code provided in the code editor or only for the logical lines of code which deviate (substantially) from the norm. In some embodiments, multiple graphical elements associated with said logical line may be provided in the GUI and colored with the first color.

In some embodiments, the selecting of the first color in block 304 and the coloring in block 305 may be carried out only in response to the value of the total deviation metric exceeding a pre-defined deviation detection threshold. The pre-defined deviation detection threshold may have been defined by a user. In other words, the computing device may have received one or more user inputs defining the deviation detection threshold via at least one user input device and subsequently stored information on said deviation detection threshold to a database.

The computing device checks, in block 306, whether there is more code to be analyzed. If this is the case, the computing device repeats blocks 303 to 306 for another logical line of code (i.e., for another program instruction defined in said logical line of code). If this is not the case, the process may proceed to block 301. If further logical lines of code are, again, obtained in block 302, these logical lines are subsequently analyzed.

Figure 4:
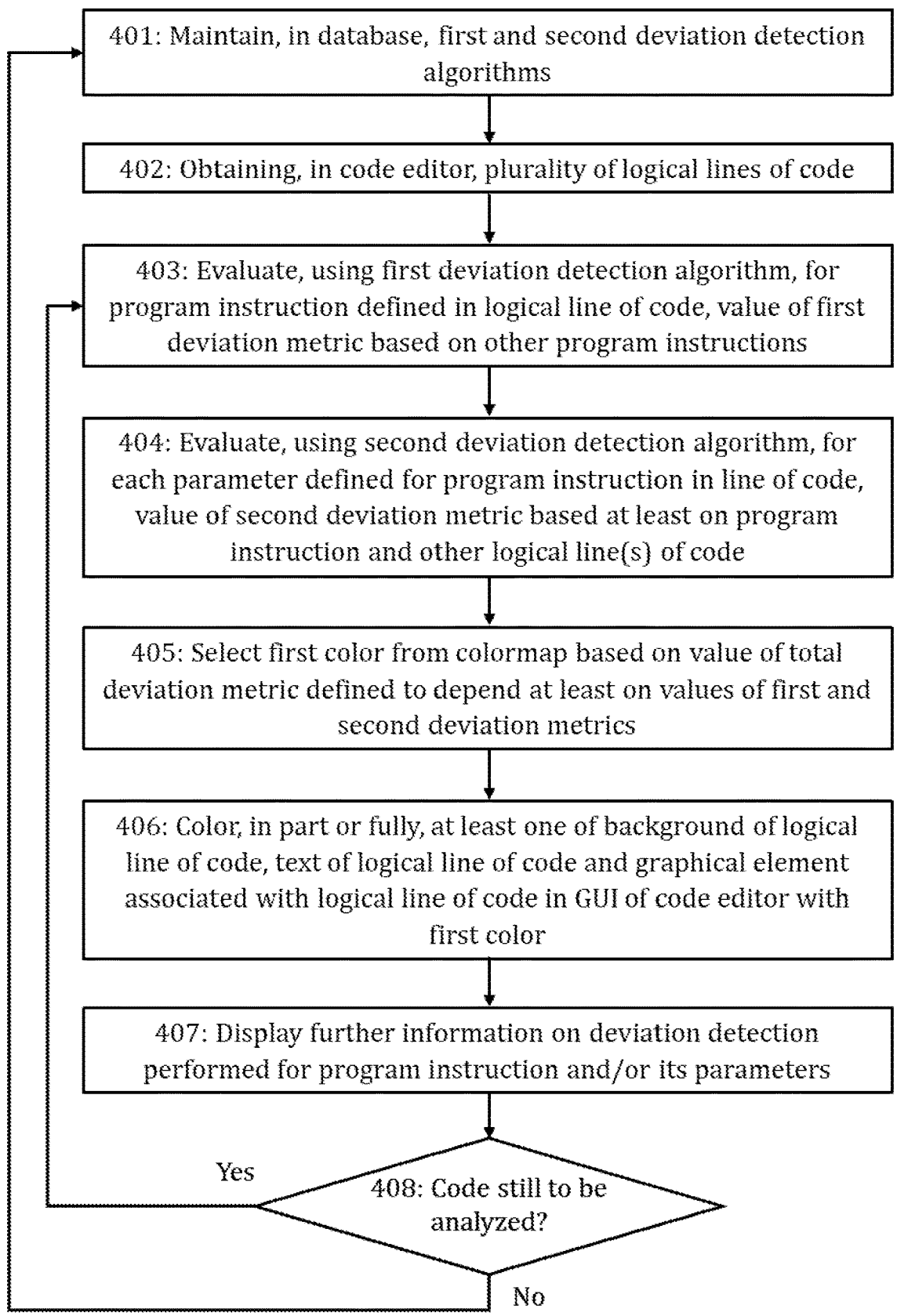

FIG. 4 illustrates another, more advanced process according to an embodiment for detecting deviations (i.e., possible errors) in code and indicating said deviations and their extent to a user. Namely, the process of FIG. 4 enables deviation detection not only based on a sequence of program instructions but also any parameters provided for said program instructions. The illustrated process may be performed by the computing device 101 of FIG. 1 or the computing device 201 of FIG. 2. The illustrated process may be especially well-suited for detecting deviations in scripts for test automation or robotic process automation as in these applications the parameters defined for program instructions are typically constants (as opposed to being, e.g., variables or function calls) and thus detecting deviations in parameters for program instructions in such applications is somewhat simplified.

Referring to FIG. 4, it is initially assumed that the computing device maintains, in block 401, in a database, a first deviation detection algorithm for evaluating values of a first deviation metric for program instructions defined in logical lines of code based at least on one or more other logical lines of code in the code editor (or specifically program instructions defined therein), similar to as discussed in relation to block 301 of FIG. 3. However, it is further assumed here that the computing device maintains, in block 401, in the database, also a second deviation detection algorithm for evaluating values of a second deviation metric for a parameter defined for a program instruction in logical line of code based at least on one or more logical lines of code in the code editor (or specifically program instructions and sets of zero or more parameters defined therein). The second deviation metric may specifically quantify a deviation of a parameter defined for a program instruction in a logical line of code in a code editor from a corresponding normative parameter based at least on one or more logical lines of code in the code editor (preferably, all the logical lines defined in the code editor). The second deviation metric may correspond, for example, to reconstruction loss associated with a second machine-learning model (e.g., based on an autoencoder) employed by the second deviation detection algorithm or a distance measure indicating a distance between a parameter predicted using a second machine-learning model and the observed parameter. The second deviation detection algorithm may have been generated based on a second normative data set comprising (source) code for a plurality of programs. The second deviation detection algorithm may be based on any deviation detection models described above, e.g., on one or more replicator neural networks or one or more autoencoders. Both first and second deviation detection algorithm may perform specifically semi-supervised deviation detection. Thus, both the first and second normative data sets may be assumed to represent, fully or at least mostly, normal, non-anomalous behavior.

In some embodiments, the second deviation detection algorithm may be adapted to evaluate a single value of the second deviation metric for each set of zero or more parameters defined for a program instruction, as opposed to evaluating a single value of the second deviation metric for each parameter defined for a program instruction.

In some embodiments, the second deviation detection algorithm is based on a plurality of pre-defined rules for detecting deviations in observed sets of zero or more parameters based on one or more other program instructions and sets of zero or more parameters defined for them in the program.

As mentioned above, the first prediction algorithm may have been generated based on a first normative data set and the second prediction algorithm may have been generated based on a second normative data set which is, preferably, smaller than the first normative data set. In some embodiments, the first and second normative data set may be partially overlapping or they may even be the same data set. In other embodiments, there is no overlap between the first and second normative data set. For example, the first normative data set may be a large data set comprising (source) code for a plurality of programs relating to a plurality of use cases and/or application (e.g., contents of a public library of programs) while the second normative data set may consist of (source) code for a plurality of programs (or even one or more programs) specific to a particular use case and/or application (or a particular limited set of related use cases and/or applications). The reason for this difference in evaluating program instructions and parameters is that program instructions and their order are typically more generic in nature (i.e., similar program instructions are employed in many applications in a similar manner) compared to values of parameters which may be defined very differently depending on the application in question. In some embodiments, the first normative data set and/or especially the second normative data set may be specific to the user or a group of users comprising said user. Said group of users may be, e.g., users associated with a specific company or organization. In other words, the first normative data set and/or especially the second normative data may comprise (source) code only for programs created by the user or the group of users. How the first and second deviation detection algorithms may be generated is discussed in detail in relation to FIG. 5.

In some embodiments, the first and second deviation detection algorithms may be integrated into a single deviation detection algorithm.

The processes of blocks 402, 403 may correspond processes described in relation to blocks 302, 303 and thus are not described here in full. In brief, the computing device obtains, in block 402, in the code editor, a plurality of logical lines of code defining a program or a part thereof and performs, for each of at least one of the plurality of logical lines of code in the code editor (preferably, all of the plurality of logical lines code), the following. First, the computing device evaluates, in block 403, using the first deviation detection algorithm, for a program instruction defined in a logical line of code at a given position in the program, a value of the first deviation metric (e.g., a first reconstruction loss or a first distance measure) based on the plurality of logical lines of code.

Following the evaluation using the first deviation detection algorithm, the computing device evaluates, in block 404, using the second deviation detection algorithm, for each parameter defined for the program instruction in the logical line of code at the given position in the program, a value of the second deviation metric based on the plurality of logical lines of code. Specifically, the evaluation in block 404 may be based at least on the program instruction defined in said logical line of code and one or more other logical lines of code defining one or more other program instructions and a set of zero or more parameters for each of said one or more other program instructions. If two or more parameters have been defined for said program instruction in the logical line of code, the evaluating of the value of the second deviation metric in block 404, for each parameter following an initial parameter (i.e., following a parameter of said program instruction evaluated first), may further be based on one or more preceding parameters defined for the program instruction (i.e., one or more parameters for which a value of the second deviation metric has been already evaluated).

As opposed to the deviation detection using the first deviation detection algorithm, in this case the deviation detection may take into account, not only the program instructions (e.g., functions), but also the parameters defined for said program instructions (e.g., numerical and string literals and constants, expressions and other statements, and their combinations). Each set of one or more parameters defined for a program instruction may comprise, for example, one or more numerical parameters (e.g., numerical literals or constants), one or more alphabetical parameters (e.g., strings or character literals), one or more tables or other data structures, one or more variables, and/or one or more references. In some embodiments (e.g., relating to scripts for test automation or robotic process automation), all parameters may be constants. To give an example, a set of one or more parameters may comprise a numerical literal such as "123" and a string literal such as "www.qentinel.com". In some embodiments, the deviation detection in block 404 may also handle contextual data outside program instructions and their parameters, to include things such as script settings, documentation and other annotations.

Said plurality of logical lines of code (or a part thereof) may be pre-processed, in block 404, before they are used as an input of the second deviation detection algorithm, similar to as discussed for the first deviation detection algorithm in relation to block 303 of FIG. 3. The difference compared to the discussion in relation to block 303 lies mostly in the fact that in this case also the parameters of the program instructions are processed. Thus, in a first pre-processing phase, the computing device may perform lexical analysis (or tokenization) on the logical lines of code so as to convert them into a sequence of lexical tokens (strings with an assigned and thus identified meaning). The sequence of lexical tokens may be filtered so as to remove any lexical tokens not associated with program instructions or their parameters. The first pre-processing phase may also comprise, for example, syntactic and/or semantic analysis and/or validation functionalities. In a second pre-processing phase, the computing device may perform word embedding for string data associated with said one or more logical lines of code (or specifically with each program instruction and parameter defined in the one or more logical lines of code). In other words, string data is mapped to a vector comprising numerical values so that it may be used as an input of the second deviation detection algorithm. Said string data may be derived according to the tokenization process described above. Additionally, normalization may be performed, in the second pre-processing phase, for at least some of the numerical values. In some embodiments, the vectorization may be performed using a separate machine-learning model (e.g., a neural network), that is, a machine-learning model not used (directly) by the first and second deviation detection algorithms. The pre-processing may, also in this case, be performed by the code editor or the prediction engine or by both the code editor and the prediction engine. The pre-processing may, in some embodiments, be performed jointly for the first and second deviation detection algorithm.

Also similar to as discussed with the first deviation detection algorithm, the second deviation detection algorithm may be based on a second prediction algorithm for predicting parameters for a program instruction based at least on said program instruction and preferably also on one or more preceding program instructions and any sets of zero or more parameters defined for said one or more preceding program instructions. Preferably, said one or more preceding program instructions comprises all preceding program instructions. In some cases, the deviation detection using the second deviation detection algorithm may be based solely on the program instruction for which parameters are to be predicted. If two or more parameters have been defined for said program instruction in the logical line of code, the predicting using the second prediction algorithm, for each parameter following an initial parameter (i.e., following a parameter of said program instruction evaluated first), may further be based on one or more preceding parameters defined for the (current) program instruction (i.e., one or more parameters for which a value of the second deviation metric has been already evaluated).

The second prediction algorithm may be, for example, a machine-learning algorithm based on one or more neural networks or one or more SVMs. In such embodiments, the evaluation in block 404 using the second deviation detection algorithm may comprise performing the following for each parameter of a program instruction. First, the computing device may calculate, using the second prediction algorithm, a probability distribution of the most probable values for a parameter defined for said program instruction under analysis based at least on said program instruction and one or more program instructions preceding said program instruction and a set of zero or more parameters defined for said one or more program instructions. In some embodiments, also preceding parameters defined for said program instruction (i.e., parameters which have already been evaluated for deviations) may also be taken into account (as described above). Then, the computing device calculates the value of the second deviation metric for the parameter based on the probability distribution of the most probable values for said parameter and the (observed) parameter included in said logical line of code. Here, the second deviation metric is defined as a second distance measure quantifying the relative difference between the probability distribution of the most probable value for the parameter and the (observed) value for the parameter included in said logical line of code. The second distance measure may be specifically defined based on probability vectors defined for the probability distribution of the most probable values for the parameter (e.g., [0.2 0.5 0.16 0.14]) and for said (observed) parameter (e.g., [0. 1 0 0]). In general, said probability vectors may be defined in a similar manner as described in relation to the first distance measure. The second distance measure may be any distance measure employed, for example, in connection with machine learning (e.g., Euclidean distance, Manhattan distance or Minkowski distance). The second distance measure may be defined, for example, as a mean squared error between the aforementioned two probability vectors.

In embodiments where the second deviation detection algorithm is a second trained machine-learning algorithm based on an autoencoder or a replicator neural network, the evaluation in block 404 using the second deviation detection algorithm may comprise the following. The computing device uses a sequence of program instructions defined in the plurality of logical lines of code (either all or some of them) and sets of zero or more parameters defined for said program instructions as an input of the autoencoder or replicator neural network. Said sequence of program instructions may comprise a pre-defined number of program instructions. In other words, the sequence of program instructions and their parameters used as the input may be defined as a sliding window. The sliding window may be of a pre-defined width (though in some embodiments its width may also be dynamically adjusted). This sliding window is applied to each possible position in the plurality of logical lines of code (i.e., it is slid across the plurality of logical lines of code). One movement step of the sliding window may correspond to a movement by a logical line of code or by a single code element (i.e., a program instruction or a parameter). As described above, the autoencoder/replicator neural network replicates its input in its output as long as the input is non-anomalous. Thus, the computing device obtains, at each position of the sliding window, an output of the autoencoder or replicator neural network comprising a replicated sequence of program instructions and parameters defined for them. The computing device may calculate, for each produced output, reconstruction loss (e.g., a MSE) between the input and the output. Finally, the computing device calculates, for each program instruction defined in a logical line of code at a given position in the program, the value of the second deviation metric based on the outputs of the autoencoder or replicator neural network. Specifically, the value of the second deviation metric may be calculated based on outputs associated with the parameter under analysis (i.e., outputs produced when a sliding window is applied so as to cover said parameter) or more specifically on values of reconstruction loss calculated for said outputs. In the latter case, the value of the second deviation metric may be calculated as an average or a sum calculated over said values of reconstruction loss, for example. In some embodiments, a stacked LSTM may be used instead of an autoencoder or a replicator neural network.

Then, the computing device selects, in block 405, a first color based on a value of a total deviation metric from a first colormap providing a mapping at least to all feasible values of the total deviation metric. In this embodiment, the value of the total deviation metric may be defined specifically to depend (at least) on the value of the first deviation metric and one or more values of the second deviation metric. For example, it may be simply a (weighted) sum or a product of the values of the first and second deviation metrics. Other common mathematical manipulations such as multiplication/subtraction by a constant, normalization and taking a logarithm may also be used in the definition. Preferably, the total deviation metric should be defined so that increase in values of the first or second deviation metrics results in increase in the total deviation metric. The color may be defined as described in relation to block 304 of FIG. 3.

The computing device colors, in block 406, in part or fully, a background of said logical line of code or a text of said logical line of code in a graphical user interface of the code editor with a first color for indicating an extent of deviation of said logical line of code from a norm (as defined by the first and second normative data for program instructions and their parameters, respectively) to a user of the computing device. The coloring may be carried out as described in relation to block 305 of FIG. 3.

As a second additional feature compared to the embodiment of FIG. 3, the computing device displays, in block 407, in the graphical user interface of the code editor, further information on the deviation detection performed for the program instruction and/or its parameters. Specifically, the further information may comprise one or more of the value of the total deviation metric, the value of the first deviation metric and one or more values of the second deviation metric. Said further information may be displayed, e.g., as numbers.

In some embodiments, the displaying of the further information in block 407 may be triggered only in response to detecting a specific user action. Said specific user action may be, for example, a mouse pointer or an insertion point of the code editor being moved on top of said logical line of code in the graphical user interface. In this case, the further information may be displayed, for example, in the form of a pop-up window showing numerical values and/or graphical representations of said numerical values.

In some embodiments, the additional feature described in relation to block 407 may be omitted or it may be combined with the embodiment of FIG. 3.

Similar to as discussed in relation to FIG. 3, the computing device checks, in block 408, whether there is more code to be analyzed. If this is the case, the computing device repeats blocks 403 to 408 for another logical line of code (i.e., for another program instruction and its parameter(s) defined in said logical line of code). If this is not the case, the process may proceed to block 401. If further logical lines of code are, again, obtained in block 402, these logical lines are subsequently analyzed.

Similar to as discussed in relation to FIG. 3, actions pertaining to blocks 405 to 407 may be carried out only in response to the value of the total deviation metric exceeding a pre-defined deviation detection threshold (possibly defined earlier by a user).

Figure 5:
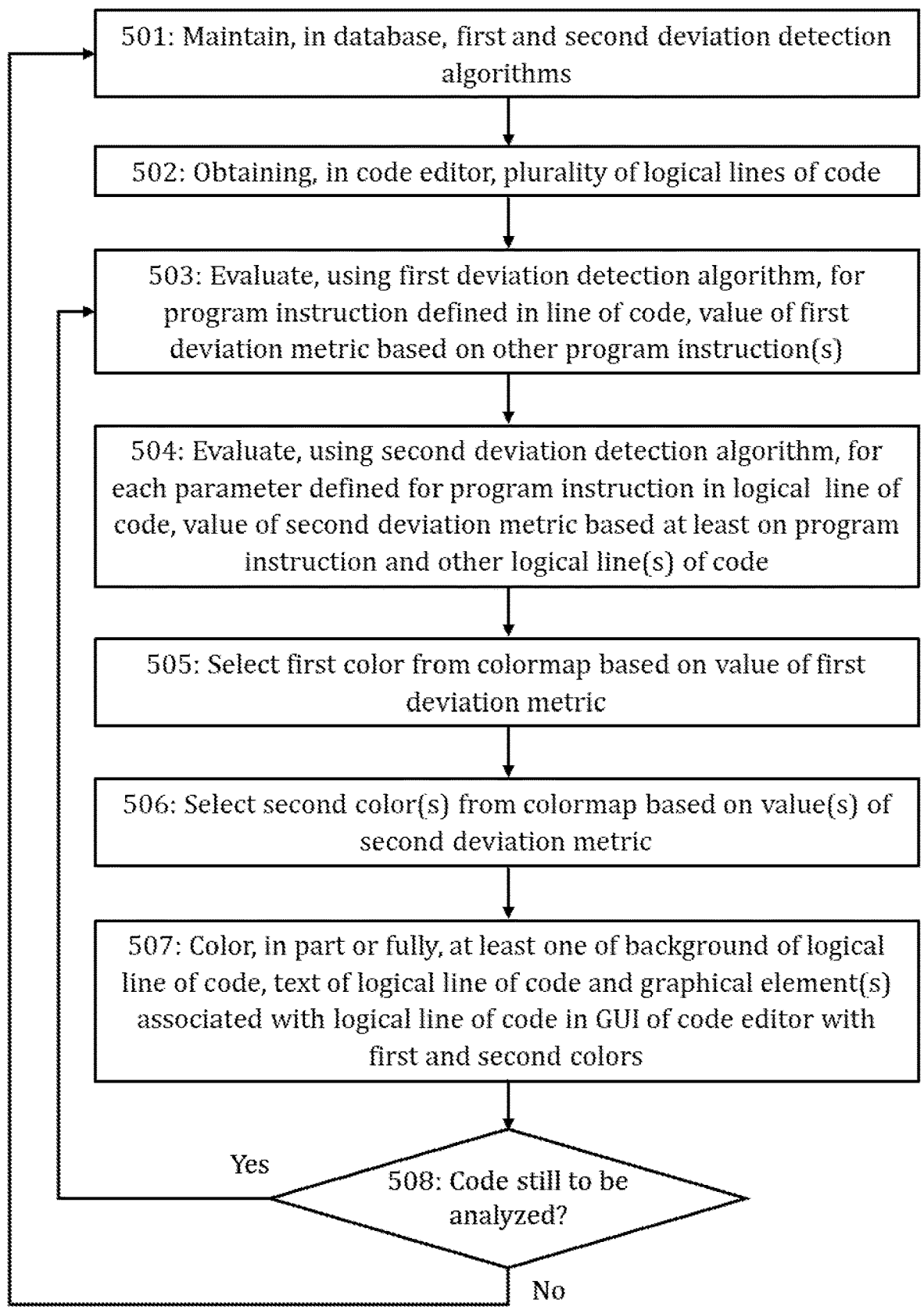

FIG. 5 illustrates another, more advanced process according to an embodiment for detecting deviations (i.e., possible errors) in code and indicating said deviations and their extent to a user. Namely, the process of FIG. 5 enables, similar to FIG. 4, deviation detection not only based on a sequence of program instructions but also any parameters provided for said program instructions. The illustrated process may be performed by the computing device 101 of FIG. 1 or the computing device 201 of FIG. 2.

The process illustrated in FIG. 5 is a variation of the process of FIG. 4. Thus, many of the definitions provided in connection with FIG. 4 apply also here. Specifically, blocks 501 to 504 may correspond fully to blocks 401 to 404 of FIG. 4 as described above and are thus not discussed here.

The difference between the processes of FIGS. 4 and 5 lies in how the deviation in a logical line of code is indicated to the user via the graphical user interface of the code editor. In FIG. 5, the computing device selects, in block 505, a first color from a first colormap providing a mapping at least to all feasible values of the first deviation metric. This action may correspond to block 304 of FIG. 3 (with the assumption that the total deviation metric is simply the first deviation metric). Then, the computing device selects, in block 506, one or more second colors from a second colormap providing a mapping at least to all feasible values of the second deviation metric based on one or more values of the second deviation metric calculated for one or more parameters (in block 504). The second colormap may be defined to cover the same color range as the first color map though the values mapped to said color range may be different (due to possibly differing definitions for the first and second deviation metrics). In general, similar definitions as described in relation to the first colormap may be employed in connection with the second colormap. For example, if the background of the logical line of text (or specifically the text defining a parameter) is to be colored, the contrast between the second color selected from the second colormap and the default background color may increase as the value of the second deviation metric increases, as described above for the first colormap, so as to further highlight higher deviations.

The computing device colors, in block 507, in part or fully, at least one of a background of said logical line of code, a text of said logical line of code and at least one graphical element associated with said logical line of code in the GUI of the code editor with the first color and the one or more second colors for indicating, to a user of the computing device, an extent of deviation of the program instruction in said logical line of code and an extent of deviation of the one or more parameters in said logical line of code from corresponding norms (as defined by the first and second normative data sets based on which the first and second deviation detection algorithm was generated and based on which it operates). In some embodiments, the computing device may color the text defining the program instruction or its background with the first color and each text defining a parameter or its background with a corresponding second color. Alternatively, the program instruction and each parameter defined for the program instruction may be associated with respective graphical elements which are colored with respective ones of the first and second colors. Each of the first and second graphical elements may be defined as described for the graphical element in relation to block 305 of FIG. 3.

Similar to as discussed in relation to FIGS. 3 and 4, actions pertaining to block 505 and block 507 (as it relates to the first color) may be carried out only in response to the value of the first deviation metric exceeding a first pre-defined deviation detection threshold (possibly defined earlier by a user) and actions pertaining to block 506 and block 507 (as it relates to the second color) may be carried out only in response to the value of the second deviation metric exceeding a second pre-defined deviation detection threshold (possibly defined earlier by a user).

Figure 6:
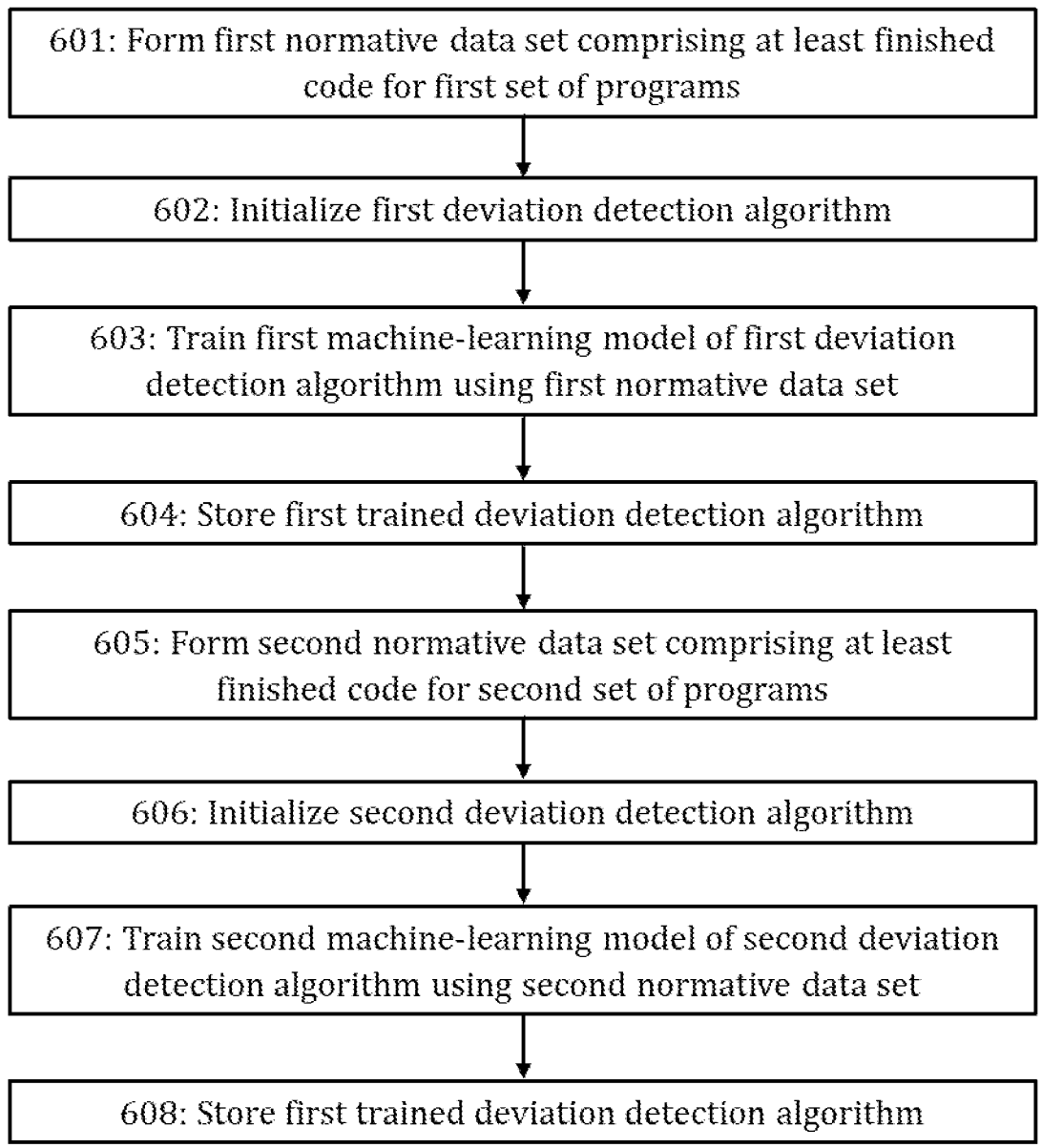

FIG. 6 illustrates a process for generating the first and second deviation detection algorithms employed in processes of FIGS. 3 and 4. Specifically, the first and second deviation detection algorithms are assumed here to be machine-learning algorithms. The process may be carried out by the same computing device which subsequently carries out the deviation detection using the first and/or second trained machine-learning algorithms according to embodiments (e.g., by any entity carrying out the processes illustrated in FIG. 3 or 4 according to embodiments). Alternatively, the training may be carried out by a separate device or system (e.g., a computing system 121 of FIG. 1) connected to the computing device running the code editor (e.g., via communications network). In this latter case, said computing device may specifically cause (or trigger) the generating and training of the first and second trained machine-learning algorithms by the computing system (e.g., by transmitting a request or command to the computing system). In some embodiments, one of the first and second machine-learning algorithms may be generated and trained by the computing device running the editor and the other by the (remote) computing system. In the following, the entity performing the process is called an apparatus for simplicity.

Referring to FIG. 6, the apparatus, first, forms, in block 601, a first normative data set comprising at least finished code for a first set of programs. The (source) code associated with the first set of programs defines a first plurality of sequences of program instructions (and parameters of said program instructions). These sequences of program instructions act as the training data set for the machine learning using a first machine-learning algorithm. They represent the norm against which the program instructions are evaluated when performing deviation detection using the first deviation detection algorithm. The first normative data set may also comprise other types of information, for example, execution logs. As mentioned above, semi-supervised deviation detection may be employed in embodiments meaning that the samples (sequences of program instructions and their parameters) in the first normative data set may be assumed to comprise mostly normal, non-anomalous samples though some anomalous samples may also be included. The first normative data set may be defined as described in relation to elements 124 to 126 of FIG. 1 or elements 224 to 226 of FIG. 1.

The user may be able to define how the first normative data set is to be formed (e.g., which data sources should be included in the first normative data set). Specifically, the computing device (running the code editor) may receive via at least one user input device one or more user inputs defining a scope or extent of the first normative data set and subsequently the apparatus may form the first normative data set according to said one or more user inputs. Said one or more user inputs may define, for example, one or more data sources and/or sets of programs to be employed for forming the first normative data set. If the apparatus here is the (remote) computing system (i.e., not the computing device running the code editor), the information on the scope or extent of the first normative data set as defined by the user may be transmitted from the computing device to the computing system via the communications network for enabling the apparatus to form the first normative data set according to the definition provided by the user. The apparatus initializes, in block 602, a first machine-learning algorithm for performing deviation detection or specifically for evaluating a first deviation metric for a program instruction based on one or more other program instructions in an associated program. The first machine-learning algorithm may be any machine learning algorithm as discussed above, e.g., a SVM-based algorithm, a replicator neural network-based algorithm, an autoencoder-based algorithm or a neural network-based algorithm employing one or more recurrent neural networks or one or more convolutional neural networks. The initialization may comprise setting or selecting initial values for weights and/or parameters of the first machine-learning model of the first deviation detection algorithm (e.g., weights of one or more neural networks). The initial values may be random values (especially weights and parameters) or they may correspond to a pre-defined set of values known to result in a well-performing algorithm. Any known initialization technique may be employed in the initialization.

In some embodiments, the user may be able to define the properties of the first machine-learning algorithm (e.g., a type of machine-learning model and any properties of said machine-learning model such as criteria for detecting a deviation and the number of preceding program instructions to be considered in the case of a prediction algorithm) before the initialization in a similar manner as described above for defining the first normative data set.

Then, the apparatus trains, in block 603, the first machine-learning model of the first deviation detection algorithm using the first normative data set (or specifically using the first plurality of sequences of program instructions defined for the plurality of programs in the first normative data set). How the training is performed depends on the type of the first machine-learning model.

If the first machine-learning model is a machine-learning model (e.g., a neural network) for predicting a probability distribution of the (most probable) next program instructions based at least on one or more preceding program instructions (as described in relation to above embodiments), the training may be carried out as follows. In the training, program instructions defined in the first plurality of sequences of program instructions define desired outputs of the first machine-learning model while one or more preceding program instructions for each program instruction defining a desired output define a corresponding input of the first machine-learning model. The program instruction used for defining the desired output in the training may be any program instruction in the sequence (though the initial program instruction may, in some embodiments, be excluded). In other words, in the training, each program instruction in each program in the first normative data set (with the possible exception of the first program instruction in a program) may define, in turn, a desired output and any program instructions preceding that logical line of code may define the input of the first machine-learning algorithm. To use common machine-learning terminology, said one or more preceding program instructions define features in the first machine-learning algorithm while the program instruction defines the label in the first machine-learning algorithm. The goal of the training is to adjust the weights/parameters of the first machine-learning algorithm (e.g., of one or more neural networks) so that the first machine-learning algorithm accurately maps the inputs to the desired outputs.

If the first machine-learning model is a machine-learning model corresponding to an autoencoder or a replicator neural network (as described in relation to above embodiments), the training may be carried out as follows. In the training, as the autoencoder or replicator neural network seeks to replicate its input at its output, each sequence of program instructions defined in the first plurality of sequences of program instructions in the first normative data set defines both inputs of the first machine-learning model and desired outputs of the first machine-learning model. To use common machine-learning terminology, each sequence of program instructions defines both features and labels in the first machine-learning algorithm. The goal of the training is to adjust the weights/parameters of the first machine-learning algorithm (e.g., of one or more neural networks) so that the first machine-learning algorithm accurately maps the inputs to the desired outputs for the most salient features in the first normative data set (but not for abnormal or anomalous features). The autoencoder or replicator neural network may be defined to have some pre-defined constraints (e.g., in terms of sparsity) so that the results of the training is not simply an identity function. Similar to as described above, a sliding window (of a pre-defined width) may be employed also in the training so that a (sub)sequence of program instruction of a pre-defined length is considered at one time.

Said first normative data set comprising (source)code for the first set of programs may be preprocessed, in block 603, before it is used as an input of the first machine-learning model. This pre-processing may be carried out in a similar manner as described in relation to block 303 of FIG. 3. Specifically, the apparatus device may perform, for each source code of the first set of programs, at least lexical analysis (or specifically tokenization) to form a sequence of tokens. This sequence of tokens may further be filtered to remove tokens not associated with program instructions. Further, the apparatus may perform at least word embedding (or vectorization) for string data associated with a sequence of program instructions in each program in the first normative data set (e.g., string data in a sequence of lexical tokens relating to program instructions). In other words, string data is mapped to numerical values (or specifically to a vector comprising numerical values). The pre-processing may also comprise assigning labels to the first normative data set. Additionally or alternatively, the pre-processing may comprise, for example, syntactic and/or semantic analysis, validation functionalities and/or normalization.

After the training in block 603, the apparatus stores, in block 604, the trained machine-learning model to the database of the computing device (i.e., the computing device running the code editor) or to another database accessible by the computing device. If the apparatus performing the training is a computing system connected to the computing device running the code editor via a communications network, the storing in block 604 may comprise causing storing of the first trained machine-learning model to the database of the computing device by, for example, transmitting the first trained machine-learning model to the computing device via the communications network for storing to the database of the computing device. The process of block 604 may be sometimes called "serialization". Alternatively, the computing system may store the first trained machine-learning model to a database of the computing system which is accessible for the computing device over the communications network for performing predictions.

The second machine-learning model is generated and trained in a similar manner as discussed for the first machine-learning model above though some differences may also exist. Unless otherwise stated, the definitions and optional features discussed in relation to the first machine-learning algorithm may apply also here.

First, the apparatus forms, in block 605, a second normative data set comprising at least finished code for a second set of programs defining a second plurality of sequences of program instructions and their parameters. The second normative data set acts as the training data set for the machine learning using a second machine-learning model. As mentioned in relation to above embodiments, this second normative data set may be more limited compared to the first normative data set. For example, the second normative data set may be specific to a particular application or use case (e.g., test automation) while the first normative data set may encompass programs written for a variety of different applications or use cases. Similar to the first normative data set, the second normative data set may be formed based on one or more user inputs defining the extent or scope of the second normative data set (e.g., by defining one or more data sources to be used). Said one or more data sources may be different for the first and second normative data sets. The user may also be able to define the properties of the second machine-learning algorithm (e.g., a type of machine-learning model and any properties of said machine-learning model such as criteria for detecting a deviation and such as a width of a sliding window used with the autoencoders/replicator neural networks) before the initialization. The second normative data set may be defined as described in relation to elements 124 to 126 of FIG. 1 or elements 224 to 226 of FIG. 1.

The apparatus initializes, in block 606, a second deviation detection algorithm for performing deviation detection or specifically for evaluating a second deviation metric for parameter(s) of a program instruction based on one or more logical lines of code in an associated program. The second machine-learning model may be a machine-learning model of any type described above. The second machine-learning algorithm may be of the same type as the first machine-learning algorithm or of different type. Similar to as described in relation to block 602, the initialization may comprise setting or selecting initial values for weights and/or parameters of a second machine-learning model of the second deviation detection algorithm (e.g., weights of one or more neural networks). The initial values may be random values (especially weights and parameters) or they may correspond to a pre-defined set of values known to result in a well-performing algorithm. Any known initialization technique may be employed in the initialization.

Then, the apparatus trains, in block 607, the second machine-learning model of the second deviation detection algorithm using the second normative data set (or specifically using the second plurality of sequences of program instructions and their parameters defined for the plurality of programs in the second normative data set). How the training is performed depends on the type of the second machine-learning model. In general, the training may be performed in a similar manner as described for the first machine-learning model though here also the parameters defined for the program instruction are taken into account.

If the second machine-learning model of the second deviation detection algorithm is a machine-learning model (e.g., a neural network) for predicting (most probable) values of a parameter (or a probability distribution thereof) for a program instructions based at least on said program instruction and one or more preceding program instructions and their parameters (as described in relation to above embodiments), the training may be carried out as follows. In the training, the each parameter defined in the second set of programs for corresponding program instructions defines a desired output of the second machine-learning model and a corresponding program instruction for which a set of one or more parameters is to be predicted and one or more preceding program instructions and sets of zero or more parameters defined for said one or more preceding program instructions define a corresponding input of the second machine-learning model. The parameter used for defining the desired output in the training may be any set of zero or more parameters defined for a program instruction (e.g., a function) in any logical line of code in the program following the first (i.e., initial) logical line of code. In other words, in the training, parameter(s) on each logical line of code in each program in the second set (with the possible exception of the first logical line of code in a program) may define, in turn, a desired output and a program instruction (e.g., function or a keyword) defined on that logical line of code and any logical lines of code preceding that logical line of code may define the input of the second machine-learning model. In other words, the program instruction defined on a given logical line of code and one or more preceding lines of code define features in the second machine-learning algorithm while a parameter defined in the given logical line of code define the label in the second machine-learning model. The goal of the training is to adjust the weights/parameters of the second machine-learning model (e.g., of one or more neural networks) so that the second machine-learning model accurately maps the inputs (i.e., features) to the desired outputs (i.e., labels).

If the second machine-learning model is a machine-learning model corresponding to an autoencoder or a replicator neural network (as described in relation to above embodiments), the training may be carried out as follows. In the training, each sequence of program instructions and sets of zero or more parameters for said program instructions defined in the second plurality of sequences of program instructions in the second normative data set defines both inputs of the second machine-learning model and desired outputs of the second machine-learning model. In other words, each sequence of program instructions and their parameters defines both features and label in the second machine-learning model. Similar to as described above, a sliding window may be employed in the training. The sliding window may be of pre-defined width (that is, width in terms of the number of program instruction and parameters or logical lines of code).

Said second normative data set comprising (source) code for the second set of programs may be pre-processed, in block 607, before it is used as an input of the second machine-learning model. This (pre-)processing may be carried out in a similar manner as described in relation to block 404 of FIG. 4. Specifically, the apparatus device may perform, for each source code of the second set of programs, lexical analysis/tokenization to form a sequence of tokens and further filter this sequence of tokens to remove tokens not associated with program instructions or parameters. Further, the apparatus may perform word embedding for string data associated with program instructions and/or parameters. Additionally or alternatively, the pre-processing may comprise, for example, syntactic and/or semantic analysis, validation functionalities and/or normalization The apparatus stores, in block 608, the second deviation detection algorithm including the second trained machine-learning model to the database of the computing device (i.e., of the computing device running the code editor). This step may also be carried out similar to as described for the first trained machine-learning algorithm in block 604. Subsequently, the computing device may employ said stored first and second deviation detection algorithms for performing deviation detection according to embodiments.

While FIG. 6 illustrates the generating and training of the first deviation detection algorithm followed by the generating and training of the second deviation detection algorithm, in other embodiments, the order of these operations may be different. In some embodiments, only one of the first and second deviation detection algorithms may be generated and trained. In some embodiments, one of the first and second machine-learning algorithms is generated and trained by the computing device (a local device) and the other by the computing system (a remote device).

Figure 7:
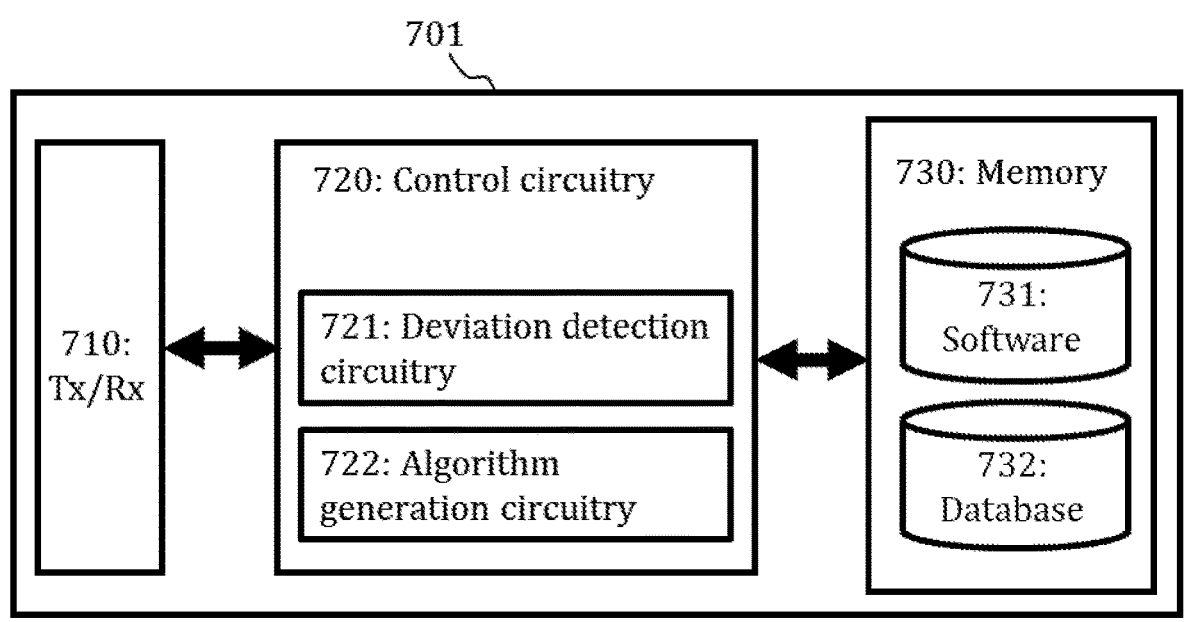
FIG. 7 illustrates an apparatus according to embodiments.

FIG. 7 illustrates an apparatus 701 configured to carry out the functions or some of the functions described above in connection with the computing device 101 or the computing device 201 illustrated in FIGS. 1 and 2, respectively. The apparatus 701 may be an electronic device comprising electronic circuitries. The apparatus 701 may be a separate entity or a plurality of separate entities (i.e., a distributed device). The apparatus 701 may be connected to a communications network, similar to as depicted in FIG. 1. The apparatus 701 may comprise a control circuitry 720 such as at least one processor, and at least one memory 730 including a computer program code (software) 731 wherein the at least one memory and the computer program code (software) are configured, with the at least one processor, to cause the apparatus 701 to carry out any one of the embodiments described above.

The memory 730 may be implemented using any suitable data storage technology, such as semiconductor-based memory devices, flash memory, magnetic memory devices and systems, optical memory devices and systems, fixed memory and removable memory. The memory may comprise a database 732 which may be or comprise any of the database 104 of FIG. 1, the database 204 of FIG. 2 and the database 223 of FIG. 2 or it may a separate database from said databases. The memory 730 may be connected to the control circuitry 720 via an interface.

The apparatus 701 may further comprise one or more interfaces 710 comprising hardware and/or software for realizing communication connectivity according to one or more communication protocols. Specifically, the one or more interfaces 710 may comprise, for example, interfaces providing a connection to a (remote) computing system via a communications network. The one or more interfaces 710 may enable receiving user inputs via one or more user input devices (e.g., a keyboard and a mouse). The one or more interfaces 710 may comprise standard well-known components such as an amplifier, filter, frequency-converter, (de)modulator, and encoder/decoder circuitries and one or more antennas.

The control circuitry 720 may comprise deviation detection circuitry 721. The deviation detection circuitry 721 may be configured to carry out at least some of blocks of FIGS. 3 to 5. The deviation detection circuitry 721 may correspond to the detection engine 103 of FIG. 1 or the detection engine 203 of FIG. 2. The control circuitry 720 may further comprise an algorithm generation circuitry 722. The algorithm generation circuitry 720 may be configured to carry out at least some of blocks of FIG. 6. The algorithm generation circuitry 720 may correspond to the algorithm generation unit 222 of FIG. 2.

In some embodiments, the algorithm generation circuitry 722 may be omitted and corresponding functionalities may be carried out by a separate computing device or system, as described in relation to FIG. 1.

In some embodiments, the apparatus 701 of FIG. 7 may correspond to a (remote) computing system (or a part thereof) such as the computing system 121 of FIG. 1. In such embodiments, the computing system 701 may comprise one or more communication control circuitry 720, such as at least one processor, and at least one memory 730, including one or more algorithms 731, such as a computer program code (software) wherein the at least one memory and the computer program code (software) are configured, with the at least one processor, to cause the computing system to carry out any one of the exemplified functionalities of the computing system described above. In some such embodiments, the deviation detection circuitry 721 may be omitted. Further, the algorithm generation circuitry 722 may be specifically configured to carry out at least some of the functionalities described above by means of FIG. 6 using one or more individual circuitries and the one or more interfaces 710 may comprise, for example, interfaces providing a connection (e.g., via a communications network) at least to one or more computing device (such as the computing device 101 of FIG. 1). Otherwise, the definitions given above in relation to FIG. 7 may apply for the computing system.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 3 to 6 may be carried out by an apparatus (e.g., computing device or a computing system) comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 6 or operations thereof.

Embodiments as described may also be carried out in the form of a computer process defined by a computer program or portions thereof. Embodiments of the methods described in connection with FIGS. 3 to 6 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a per-son skilled in the art that the described embodiments may, but are not required to, be combined with other embodiments in various ways.

The invention claimed is:

1. A computing device comprising:
   at least one processor; and
   at least one memory including computer program code, the at least one memory and computer program code configured to, with the at least one processor, cause the computing device to perform:
   maintaining, in a database, a first deviation detection algorithm for evaluating values of a first deviation metric quantifying a deviation of a program instruction provided in a logical line of code in a code editor from a corresponding normative program instruction based on one or more other program instructions defined in the code editor, wherein the first deviation detection algorithm has been generated based on a first normative data set comprising source code for a first set of programs;
   obtaining, in the code editor, a plurality of logical lines of code defining a program or a part thereof; and
   performing, for each of at least one of the plurality of logical lines of code in the code editor, the following:
   evaluating, using the first deviation detection algorithm, for a program instruction defined in a logical line of code at a given position in the program, a value of the first deviation metric based at least on one or more other program instructions defined in the plurality of logical lines of code,
   selecting a first color based on a value of a total deviation metric from a first colormap providing a mapping at least to all feasible values of the total deviation metric, wherein the value of the total deviation metric is defined to depend at least on the value of the first deviation metric, and
   coloring, in part or fully, at least one of a background of the logical line of code, a text of the logical line of code and at least one graphical element associated with the logical line of code in a graphical user interface of the code editor with the first color for indicating an extent of deviation of said logical line of code from a norm to a user of the computing device.

2. The computing device of claim 1, wherein the total deviation metric is the first deviation metric.

3. The computing device of claim 1, wherein the first deviation detection algorithm is based on a first prediction model for predicting most probable next program instructions based at least on one or more preceding program instructions and the evaluating of the value of the first deviation metric using the first deviation detection algorithm comprises:
   calculating, using the first prediction model, a probability distribution of the most probable program instructions to be included in said logical line of code based on one or more preceding program instructions; and
   calculating the value of the first deviation metric as a value of a distance measure quantifying a relative difference between the probability distribution and the program instruction included in said logical line of code.

4. The computing device of claim 1, wherein the first deviation detection algorithm is based on a first trained machine-learning model being one of an autoencoder or a replicator neural network and the evaluating of the value of the first deviation metric using the first deviation detection algorithm comprises:
   using each sequence of program instructions defined through a sliding window being applied over the plurality of logical lines of code as an input of the first trained machine-learning model;
   receiving, at each position of the sliding window, an output of the first trained machine-learning model comprising a replicated sequence of program instructions;
   calculating, for each position of the sliding window, a reconstruction loss between the input and the output of the first trained machine-learning model; and
   calculating, for each program instruction in said at least one of the plurality of logical lines of code, the value of the first deviation metric as an average or a sum over reconstruction losses associated with said program instruction.

5. The computing device according to claim 1, wherein the first deviation detection algorithm is based on a first trained machine-learning model and the at least one memory and the computer program code are configured, with the at least one processor, to cause the computing device to generate the first deviation detection algorithm by performing the following or to cause a computing system connected via a communications network to the computing device to perform the following:
   forming the first normative data set comprising at least finished code for the first set of programs defining a first plurality of sequences of program instructions;
   initializing the first deviation detection algorithm;
   training the first machine-learning model of the first deviation detection algorithm using the first normative data set, wherein
   if the first machine-learning model is a machine-learning model for predicting most probable next program instructions based at least on one or more preceding program instructions, program instructions defined in the first plurality of sequences of program instructions define desired outputs of the first machine-learning model and one or more preceding program instructions, for each program instruction defining a desired output, define a corresponding input of the first machine-learning model or,
   if the first machine-learning model is an autoencoder or a replicator neural network, sequences of program instructions defined in the first plurality of sequences of program instructions in the first normative data set define both inputs of the first machine-learning model and desired outputs of the first machine-learning model; and
   storing the first deviation detection algorithm including the first machine-learning model following the training to the database of the computing device.

6. The computing device according to claim 1, wherein the at least one memory and the computer program code are configured, with the at least one processor, to cause the computing device to perform the selecting of the first color and the coloring using the first color in response to the value of the total deviation metric exceeding a pre-defined deviation detection threshold.

7. The computing device according to claim 1, wherein the at least one memory and the computer program code are configured, with the at least one processor, to cause the computing device to further perform:
maintaining, in a database, a second deviation detection algorithm for evaluating values of a second deviation metric quantifying a deviation of a parameter defined for a program instruction provided in a logical line of code in a code editor from a corresponding normative parameter defined for said program instruction based at least on said program instruction and one or more other logical lines of code in the code editor, wherein the second deviation detection algorithm has been generated based on a second normative data set comprising source code for a second set of programs and the value of the total deviation metric is defined to depend on the value of the first deviation metric and one or more values of the second deviation metric;
performing, for each of said at least one of the plurality of logical lines of code in the code editor, also the following:
evaluating, using the second deviation detection algorithm, for each parameter defined for the program instruction in the logical line of code at the given position in the program, a value of the second deviation metric based at least on the program instruction defined in said logical line of code and one or more other logical lines of code defining one or more other program instructions and a set of zero or more parameters for each of said one or more other program instructions.

8. The computing device according to claim 7, wherein the first normative data set comprises source code relating to a plurality of use cases and applications and the second normative data set consists of source code for a particular use case or application.

9. The computing device according to claim 7, wherein the at least one memory and the computer program code are configured, with the at least one processor, to cause the computing device to further perform, before generation of the first and second deviation detection algorithms:
receiving one or more user inputs defining an extent of at least one of the first normative data set and the second normative data set via at least one user input device; and
causing the forming of said at least one of the first normative data set and the second normative data set according to said one or more user inputs.

10. The computing device according to claim 7, wherein the first deviation detection algorithm is based on a first trained machine-learning model for predicting most probable next program instructions based at least on one or more preceding program instructions or a first trained autoencoder or replicator neural network for replicating normal sequences of program instructions and the second deviation detection algorithm is based on a second trained machine-learning model for predicting most probable parameters for a program instruction based at least on said program instruction, one or more preceding program instructions and one or more parameters defined for the one or more preceding program instructions or a second trained autoencoder or a second trained replicator neural network for replicating normal sequences of program instructions and normal parameters defined for said program instructions, each of the first trained machine-learning model and the second trained machine-learning model being a trained neural network or a trained support vector machine.

11. The computing device according to claim 1, wherein the total deviation metric is equal to the first deviation metric and the at least one memory and the computer program code are configured, with the at least one processor, to cause the computing device to further perform:
maintaining, in a database, a second deviation detection algorithm for evaluating values of a second deviation metric quantifying a deviation of a parameter defined for a program instruction provided in a logical line of code in a code editor from a corresponding normative parameter for said program instruction based at least on said program instruction and one or more other logical lines of code in the code editor, wherein the second deviation detection algorithm has been generated based on a second normative data set comprising source code for a second set of programs;
performing, for each of said at least one of the plurality of logical lines of code in the code editor, also the following:
evaluating, using the second deviation detection algorithm, for each parameter defined for the program instruction in the logical line of code at the given position in the program, a value of the second deviation metric based at least on the program instruction defined in said logical line of code and one or more other logical lines of code defining one or more other program instructions and a set of zero or more parameters for each of said one or more other program instructions;
selecting one or more second colors based on one or more values of the second deviation metric from a second colormap providing a mapping at least to all feasible values of the second deviation metric; and
coloring, in part or fully, at least one of the background of the logical line of code, the text of the logical line of code and the at least one graphical element associated with the logical line of code in the graphical user interface of the code editor with the one or more second colors.

12. The computing device according to claim 11, wherein the first normative data set comprises source code relating to a plurality of use cases and applications and the second normative data set consists of source code for a particular use case or application.

13. The computing device according to claim 11, wherein the at least one memory and the computer program code are configured, with the at least one processor, to cause the computing device to further perform, before generation of the first and second deviation detection algorithms:
receiving one or more user inputs defining an extent of at least one of the first normative data set and the second normative data set via at least one user input device; and
causing the forming of said at least one of the first normative data set and the second normative data set according to said one or more user inputs.

14. The computing device according to claim 11, wherein the first deviation detection algorithm is based on a first trained machine-learning model for predicting most probable next program instructions based at least on one or more preceding program instructions or a first trained autoencoder or replicator neural network for replicating normal sequences of program instructions and the second deviation detection algorithm is based on a second trained machine-learning model for predicting most probable parameters for a program instruction based at least on said program instruction, one or more preceding program instructions and one or more parameters defined for the one or more preceding program instructions or a second trained autoencoder or a second trained replicator neural network for replicating normal sequences of program instructions and normal parameters defined for said program instructions, each of the first trained machine-learning model and the second trained machine-learning model being a trained neural network or a trained support vector machine.

15. The computing device according to claim 1, wherein the background of the logical line of code is colored, at least in part, with the first color and the first colormap is defined so that a contrast between a default background color of the code editor and a color in the first color map associated with a value of the total deviation metric increases as the value of the total deviation metric increases.

16. The computing device according to claim 1, wherein evaluating using one or both of the first deviation detection algorithm and a second deviation detection algorithm is based on both contents of the plurality of logical lines of code and an order of the plurality of logical lines of code.

17. A non-transitory computer readable media having stored thereon instructions that, when executed by a computing device, cause the computing device to perform:
maintaining, in a database, a first deviation detection algorithm for evaluating values of a first deviation metric quantifying a deviation of a program instruction provided in a logical line of code in a code editor from a corresponding normative program instruction based on one or more other program instructions defined in the code editor, wherein the first deviation detection algorithm has been generated based on a first normative data set comprising source code for a first set of programs;
obtaining, in the code editor, a plurality of logical lines of code defining a program or a part thereof;
performing, for each of at least one of the plurality of logical lines of code in the code editor, the following:
evaluating, using the first deviation detection algorithm, for a program instruction defined in a logical line of code at a given position in the program, a value of the first deviation metric based at least on one or more other program instructions defined in the plurality of logical lines of code,
selecting a first color based on a value of a total deviation metric from a first colormap providing a mapping at least to all feasible values of the total deviation metric, wherein the value of the total deviation metric is defined to depend at least on the value of the first deviation metric, and
coloring, in part or fully, at least one of a background of the logical line of code, a text of the logical line of code and at least one graphical element associated with the logical line of code in a graphical user interface of the code editor with the first color for indicating an extent of deviation of said logical line of code from a norm to a user of the computing device.

18. A method comprising:
maintaining, in a database, a first deviation detection algorithm for evaluating values of a first deviation metric quantifying a deviation of a program instruction provided in a logical line of code in a code editor from a corresponding normative program instruction based on one or more other program instructions defined in the code editor, wherein the first deviation detection algorithm has been generated based on a first normative data set comprising source code for a first set of programs;
obtaining, in the code editor, a plurality of logical lines of code defining a program or a part thereof;
performing, for each of at least one of the plurality of logical lines of code in the code editor, the following:
evaluating, using the first deviation detection algorithm, for a program instruction defined in a logical line of code at a given position in the program, a value of the first deviation metric based at least on one or more other program instructions defined in the plurality of logical lines of code,
selecting a first color based on a value of a total deviation metric from a first colormap providing a mapping at least to all feasible values of the total deviation metric, wherein the value of the total deviation metric is defined to depend at least on the value of the first deviation metric, and
coloring, in part or fully, at least one of a background of the logical line of code, a text of the logical line of code and at least one graphical element associated with the logical line of code in a graphical user interface of the code editor with the first color for indicating an extent of deviation of said logical line of code from a norm to a user of a computing device running the code editor.

* * * * *